US012720200B2

(12) United States Patent
Suzuki et al.

(10) Patent No.: US 12,720,200 B2
(45) Date of Patent: Aug. 25, 2026

(54) IMAGE PROCESSING APPARATUS AND IMAGING SYSTEM

(71) Applicant: Sony Semiconductor Solutions Corporation, Kanagawa (JP)

(72) Inventors: Yuichi Suzuki, Kanagawa (JP); Tsurayuki Oishi, Tokyo (JP); Seiji Kuroda, Tokyo (JP); Yoshitaka Sugimoto, Tokyo (JP); Akira Yokokawa, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 32 days.

(21) Appl. No.: 18/847,465

(22) PCT Filed: Jan. 27, 2023

(86) PCT No.: PCT/JP2023/002598
§ 371 (c)(1),
(2) Date: Sep. 16, 2024

(87) PCT Pub. No.: WO2023/181630
PCT Pub. Date: Sep. 28, 2023

(65) Prior Publication Data

US 2025/0203205 A1 Jun. 19, 2025

(30) Foreign Application Priority Data

Mar. 23, 2022 (JP) ................................ 2022-046232

(51) Int. Cl.
*H04N 23/68* (2023.01)
*H04N 23/611* (2023.01)
(Continued)

(52) U.S. Cl.
CPC ....... *H04N 23/683* (2023.01); *H04N 23/6811* (2023.01); *H04N 23/685* (2023.01); *H04N 23/611* (2023.01)

(58) Field of Classification Search
CPC ............. H04N 23/683; H04N 23/6811; H04N 23/685; H04N 23/611; H04N 23/60;
(Continued)

(56) References Cited

U.S. PATENT DOCUMENTS 10,110,812 B2 * 10/2018 Iwasaki ................ H04N 23/698
2004/0160525 A1 * 8/2004 Kingetsu ............ H04N 23/6812
348/E5.046

FOREIGN PATENT DOCUMENTS

JP 2004357040 A 12/2004
JP 2007074031 A 3/2007
(Continued)

OTHER PUBLICATIONS

International Search Report (PCT/ISA/210), International Application No. PCT/JP2023/002598, dated Apr. 11, 2023.

*Primary Examiner* — Ahmed A Berhan
(74) *Attorney, Agent, or Firm* — Michael Best & Friedrich LLP

(57) ABSTRACT

An image processing apparatus according to the present disclosure includes: a movement detector that detects a change amount of a desired object image in a plurality of continuously captured images and that generates movement information regarding the desired object image; an image corrector that generates a plurality of corrected images in which a change of the desired object image between the plurality of captured images is corrected on a basis of the movement information generated by the movement detector; and an exposure processor that generates an exposure image
(Continued)

in a desired exposure state on a basis of the plurality of corrected images generated by the image corrector.

17 Claims, 32 Drawing Sheets

(51) Int. Cl.
*H04N 23/73* (2023.01)
*H04N 23/741* (2023.01)

(58) Field of Classification Search
CPC .. H04N 23/6812; H04N 23/73; H04N 23/741; H04N 23/76; H04N 23/80; G03B 5/00; G03B 7/091; G03B 15/00
See application file for complete search history.

(56) References Cited

FOREIGN PATENT DOCUMENTS

| | | |
|---|---|---|
| JP | 2010136058 A | 6/2010 |
| JP | 2017041736 A | 2/2017 |

* cited by examiner

LI-GHT
CHA-RGE
101
I-V
111
AGC
112
A/D
113
MIPI-CSI
114

[ FIG. 3 ]
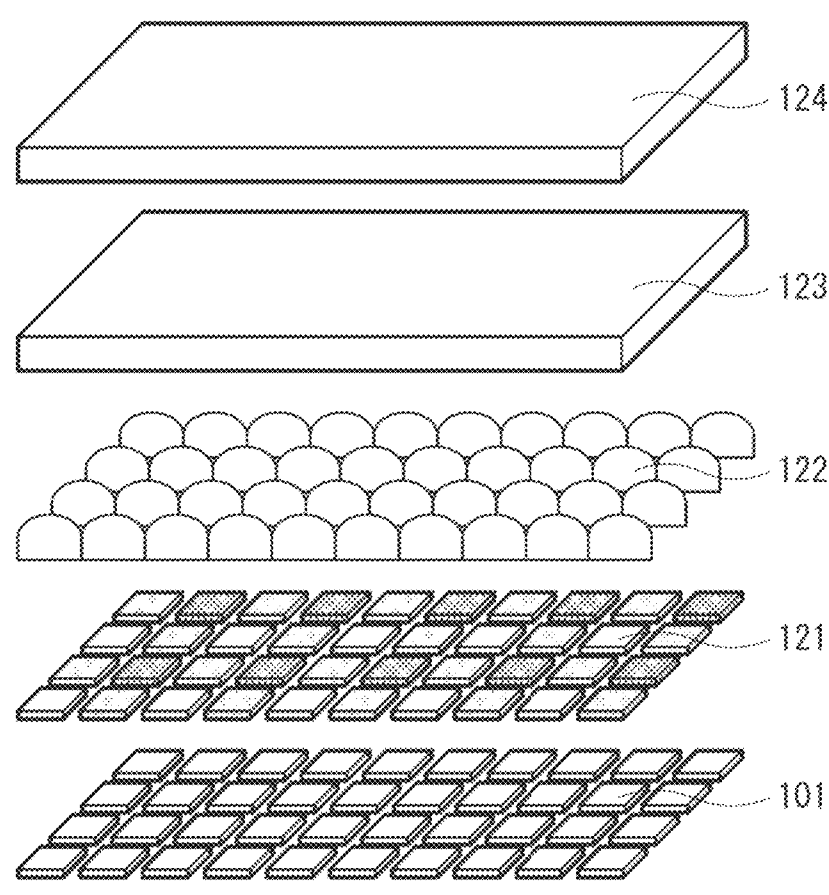

[ FIG. 4 ]
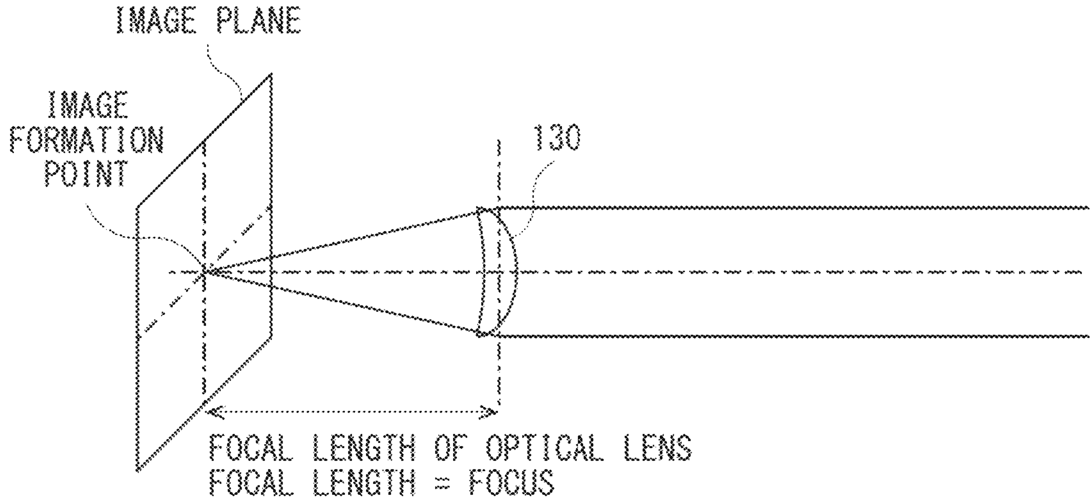

[ FIG. 5 ]
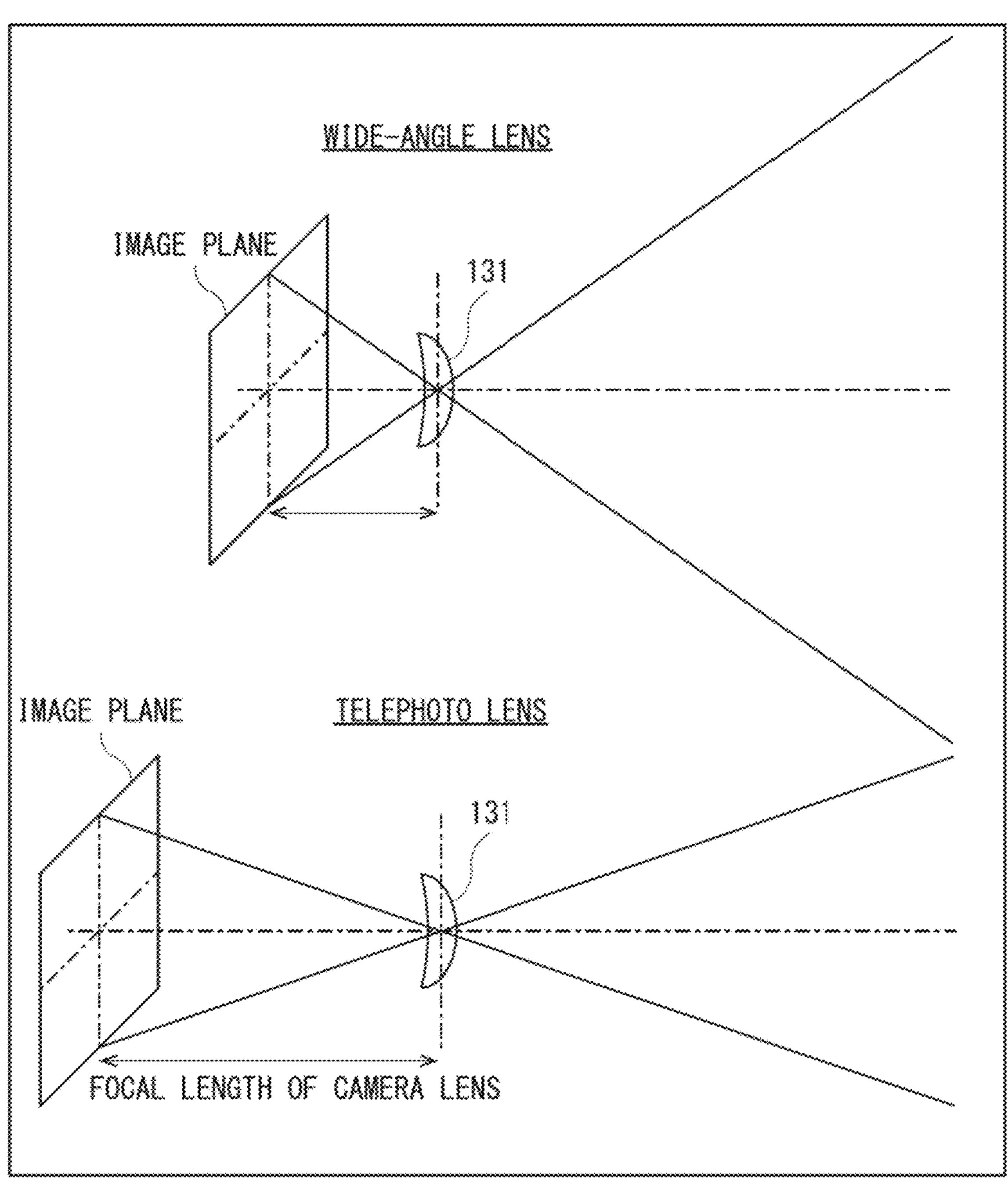

[ FIG. 6 ]
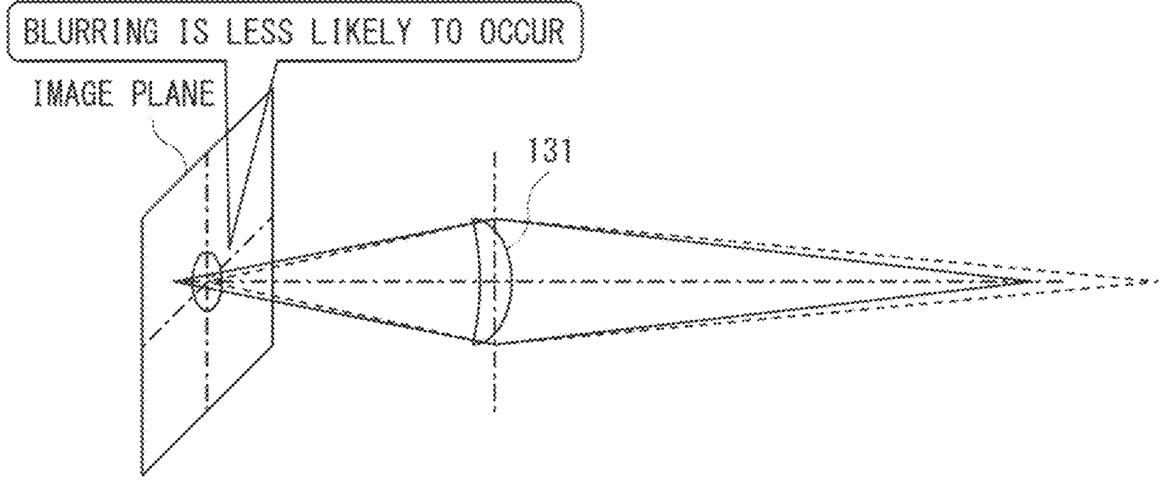
[ FIG. 7 ]
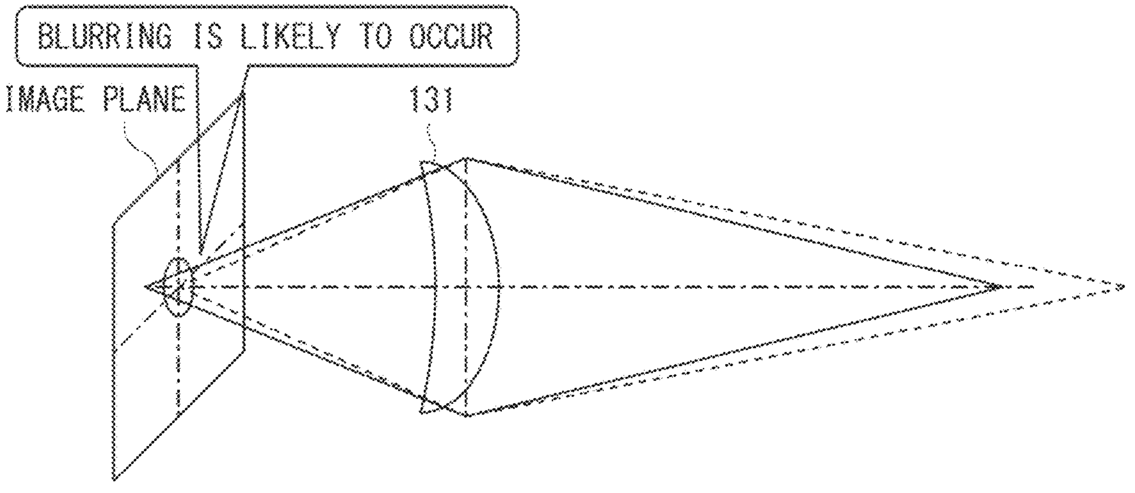

[ FIG. 8 ]
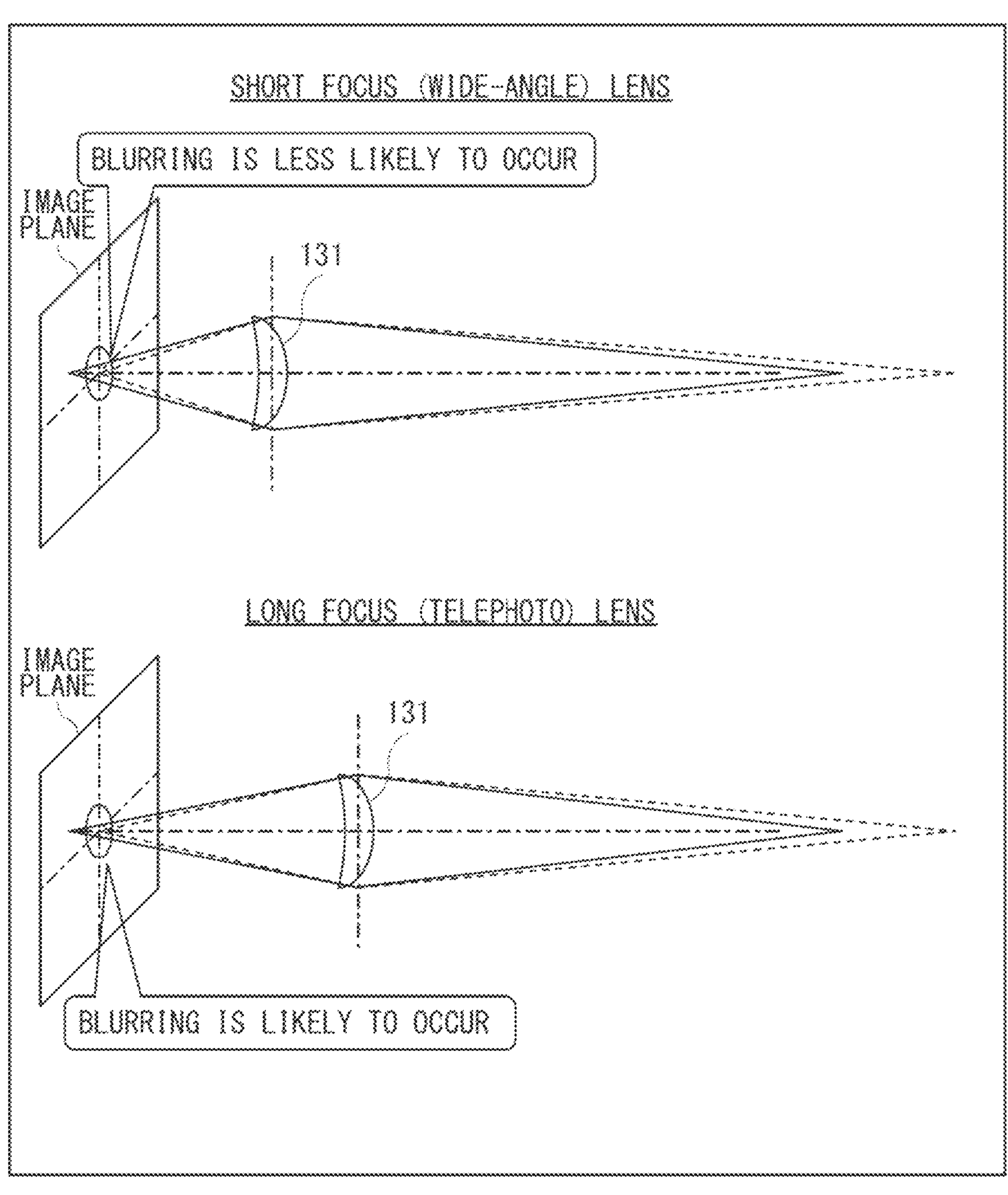

[ FIG. 15 ]

256-LEVEL
GRAYSCALE
8bit
113
A/D
112
AGC
PHOTON

FIG. 17
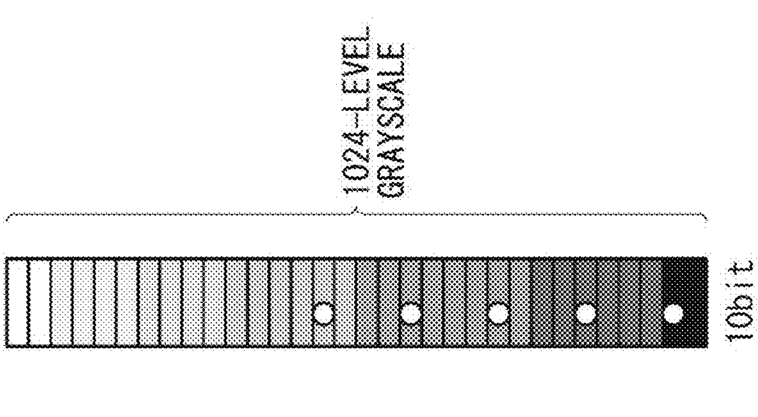
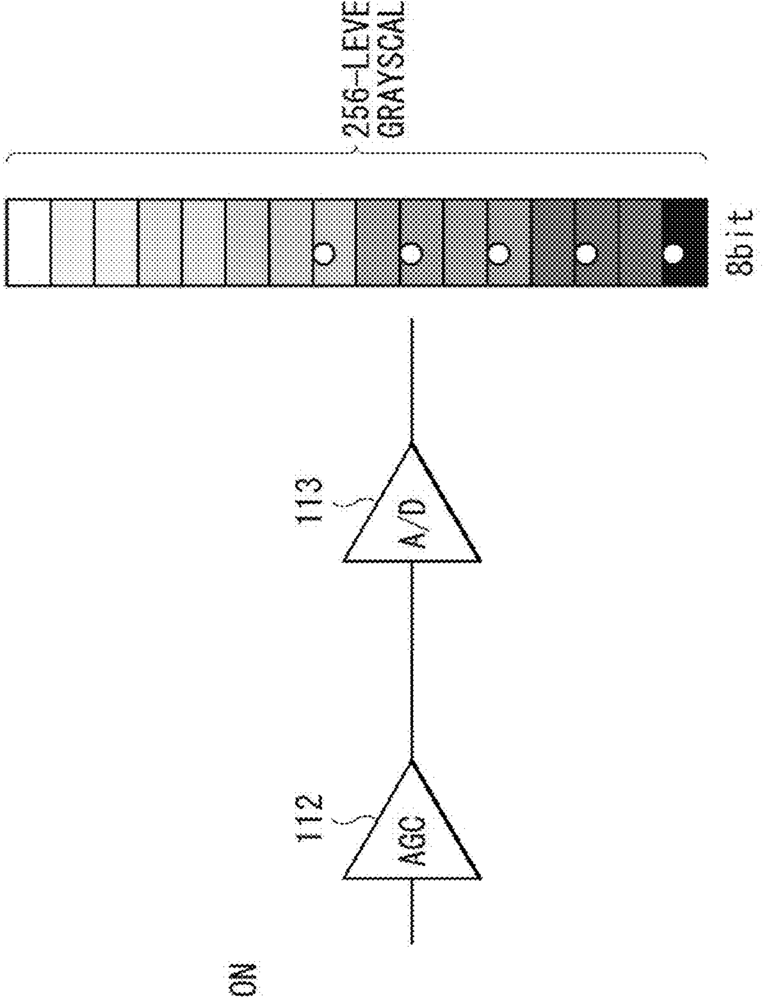

[ FIG. 26 ]
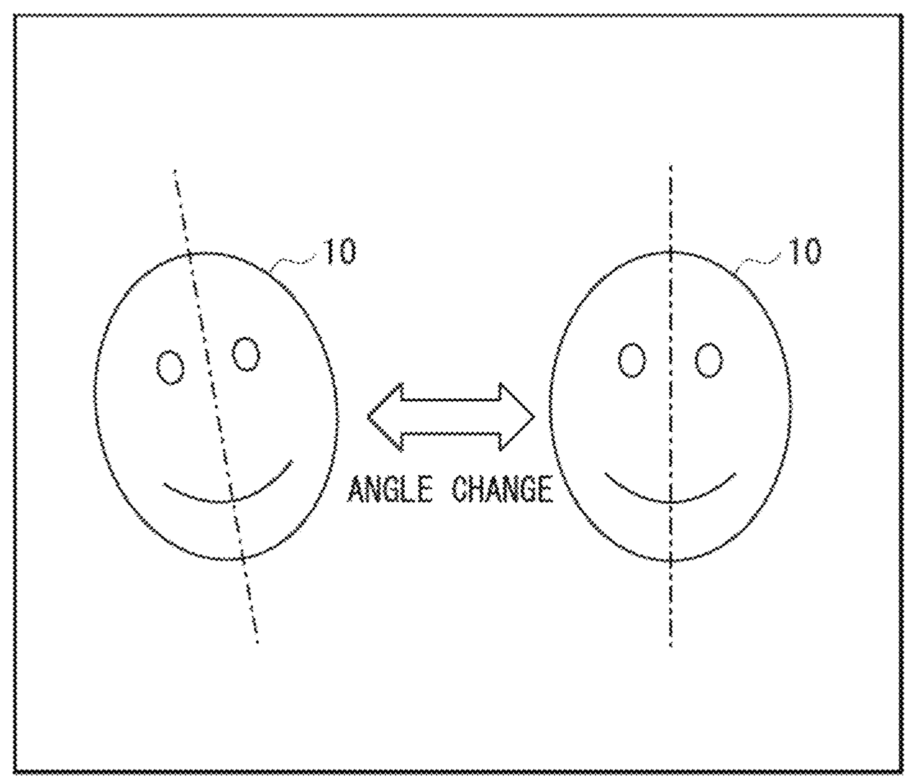

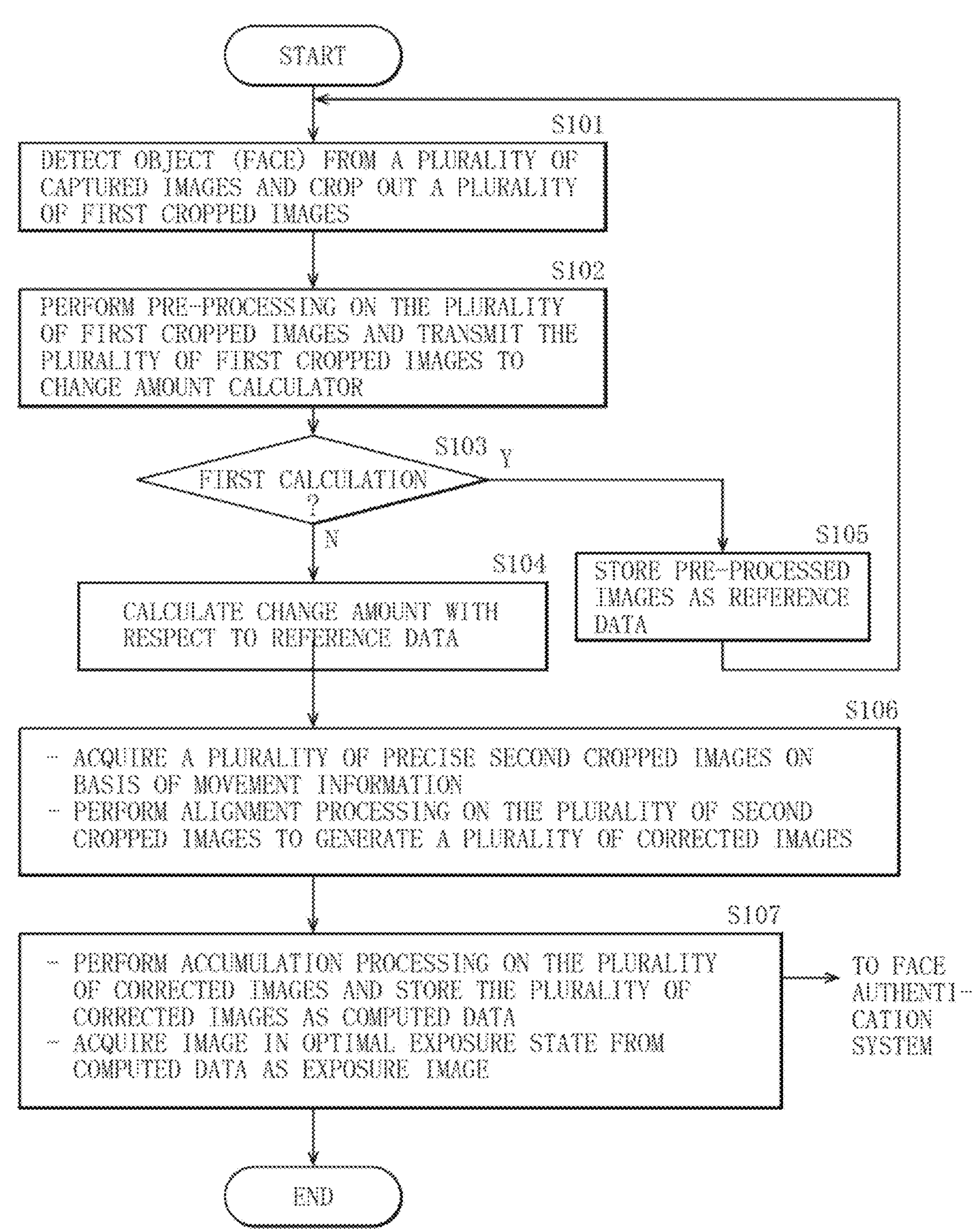
[ FIG. 27 ]
START
S101
DETECT OBJECT (FACE) FROM A PLURALITY OF CAPTURED IMAGES AND CROP OUT A PLURALITY OF FIRST CROPPED IMAGES
S102
PERFORM PRE-PROCESSING ON THE PLURALITY OF FIRST CROPPED IMAGES AND TRANSMIT THE PLURALITY OF FIRST CROPPED IMAGES TO CHANGE AMOUNT CALCULATOR
S103
FIRST CALCULATION ?
Y
N
S104
CALCULATE CHANGE AMOUNT WITH RESPECT TO REFERENCE DATA
S105
STORE PRE-PROCESSED IMAGES AS REFERENCE DATA
S106
- ACQUIRE A PLURALITY OF PRECISE SECOND CROPPED IMAGES ON BASIS OF MOVEMENT INFORMATION
- PERFORM ALIGNMENT PROCESSING ON THE PLURALITY OF SECOND CROPPED IMAGES TO GENERATE A PLURALITY OF CORRECTED IMAGES
S107
- PERFORM ACCUMULATION PROCESSING ON THE PLURALITY OF CORRECTED IMAGES AND STORE THE PLURALITY OF CORRECTED IMAGES AS COMPUTED DATA
- ACQUIRE IMAGE IN OPTIMAL EXPOSURE STATE FROM COMPUTED DATA AS EXPOSURE IMAGE
TO FACE AUTHENTI-CATION SYSTEM
END

[ FIG. 30 ]

IMAGE PROCESSING APPARATUS AND IMAGING SYSTEM

TECHNICAL FIELD

The present disclosure relates to an image processing apparatus and an imaging system.

BACKGROUND ART

For example, an image used for face authentication is preferably a bright image in which each of noise and image blurring is suppressed. Meanwhile, as a method of capturing an image of a dark object with an electron camera and obtaining a bright image, there are a method of amplifying an image signal and a method of elongating exposure time. Additionally, as a method of obtaining an image in which image blurring is suppressed, there is a technique of combining a plurality of images (refer to, for example, PTL 1).

CITATION LIST

Patent Literature

PTL 1: Japanese Unexamined Patent Application Publication No. 2004-357040

SUMMARY OF THE INVENTION

In the method of amplifying an image signal, a noise component is also amplified. Meanwhile, in the method of elongating exposure time, image blurring occurs when an object moves. For this reason, it has been difficult to suppress both noise and image blurring.

It is desirable to provide an image processing apparatus and an imaging system that enable generation of an image in a desired exposure state where each of noise and image blurring is suppressed after imaging.

An image processing apparatus according to one embodiment of the present disclosure includes: a movement detector that detects a change amount of a desired object image in a plurality of continuously captured images and that generates movement information regarding the desired object image; an image corrector that generates a plurality of corrected images in which a change of the desired object image between the plurality of captured images is corrected on a basis of the movement information generated by the movement detector; and an exposure processor that generates an exposure image in a desired exposure state on a basis of the plurality of corrected images generated by the image corrector.

An imaging system according to one embodiment of the present disclosure includes: an imager; a movement detector that detects a change amount of a desired object image in a plurality of continuously captured images captured by the imager and that generates movement information regarding the desired object image; an image corrector that generates a plurality of corrected images in which a change of the desired object image between the plurality of captured images is corrected on a basis of the movement information generated by the movement detector; and an exposure processor that generates an exposure image in a desired exposure state on a basis of the plurality of corrected images generated by the image corrector.

In the image processing apparatus or the imaging system according to one embodiment of the present disclosure, the exposure image in the desired object state is generated on the basis of the plurality of corrected images corrected on the basis of the movement information regarding the desired object image in the plurality of continuously captured images.

BRIEF DESCRIPTION OF DRAWING

FIG. 3 is an explanatory view schematically illustrating an optical structure of a typical image sensor.

FIG. 4 is an explanatory view schematically illustrating an example of a focal length of an optical lens.

FIG. 5 is an explanatory view illustrating an example of a focal length of a camera lens.

FIG. 6 is an explanatory view schematically illustrating an example of a depth of field in a case where the camera lens is a small-diameter lens.

FIG. 7 is an explanatory view schematically illustrating an example of a depth of field in a case where the camera lens is a large-diameter lens.

FIG. 8 is an explanatory view illustrating an example of a depth of field in a case where the camera lens is a wide-angle lens and an example of a depth of field in a case where the camera lens is a telephoto lens.

FIG. 17 is an explanatory view illustrating an outline of a high dynamic range (HDR) as the number of bits to express.

FIG. 26 is an explanatory view schematically illustrating an example of an angle change of an object.

FIG. 27 is a flowchart describing an example of a processing operation of the image processing apparatus according to one embodiment.

MODES FOR CARRYING OUT THE INVENTION

Some embodiments of the present disclosure will be described in detail below with reference to the drawings. Note that the description will be given in the following order.

1. One Embodiment
   1.1 Principle of Capturing of Digital Image
   1.2 Issues and Comparative Example
   1.3 Configuration and Operation
   1.4 Modification Examples
   1.5 Effects
2. Other Embodiments

1. One Embodiment

[1.1 Principle of Capturing of Digital Image]

Before a description is given of a technology according to one embodiment, the principle of typical capturing of a digital image according to a comparative example will be described.

(Principle of Image Pickup Device)

Figure 1:
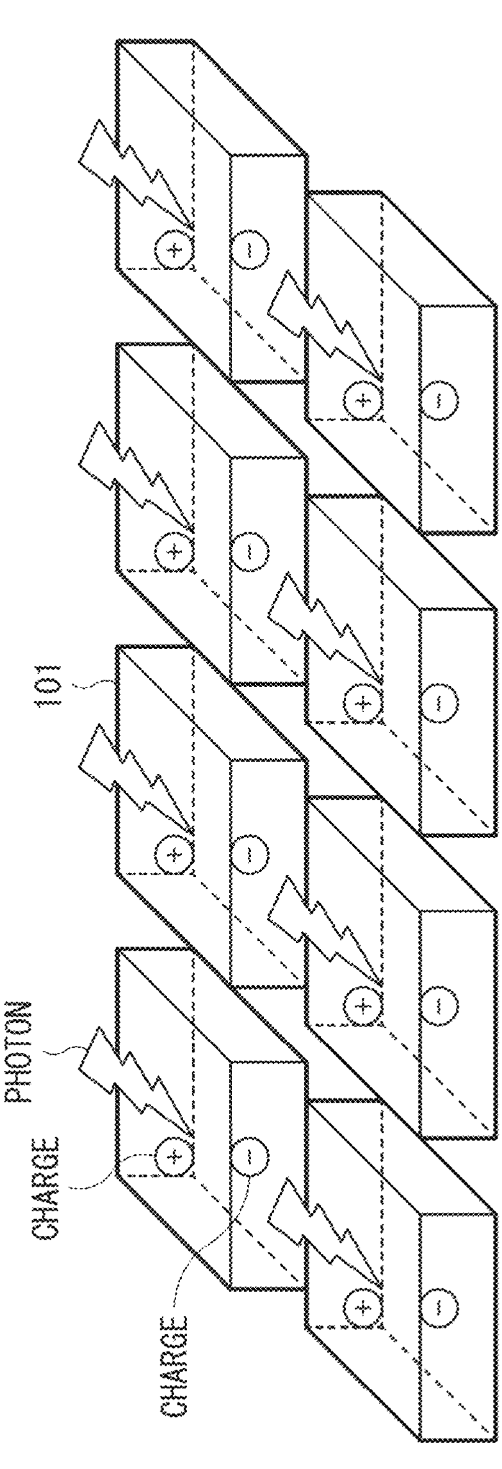
FIG. 1 is an explanatory view schematically illustrating the principle of a typical image pickup device.

FIG. 1 schematically illustrates the principle of a typical image pickup device.

The principle of a modern electron camera is that perturbations are caused in electronic coupling in a semiconductor due to incident photons, and optic (O)-electric (E) conversion that generates a pair of a negative charge (n-type carrier), and a positive charge (p-type carrier) is performed. An image sensor of the electron camera includes multitudes of image pickup devices 101 (light-receiving devices) orderly arranged in vertical and horizontal directions. Photons incident on each image pickup device 101 generate pairs of charges corresponding to the number of photons. The generated positive charge and negative charge are attracted to respective electrodes that are mutually opposite in polarity, and charges in an amount corresponding to light intensity (the number of photons) are accumulated in each image pickup device 101. There have been variations in sensitivity of the image pickup device 101 in each pixel, which has been a cause for fixed noise. Approaches for suppressing fixed noise have been currently employed such as correction performed in an imaging circuit in a subsequent stage, in addition to improvement of accuracy and variations in sensitivity. As a resolution of the image sensor becomes higher, an area of a photodiode as the image pickup device 101 becomes smaller, and an amount of received light is reduced per pixel.

(Configuration and Operation of Imaging Circuit)

Figure 2:
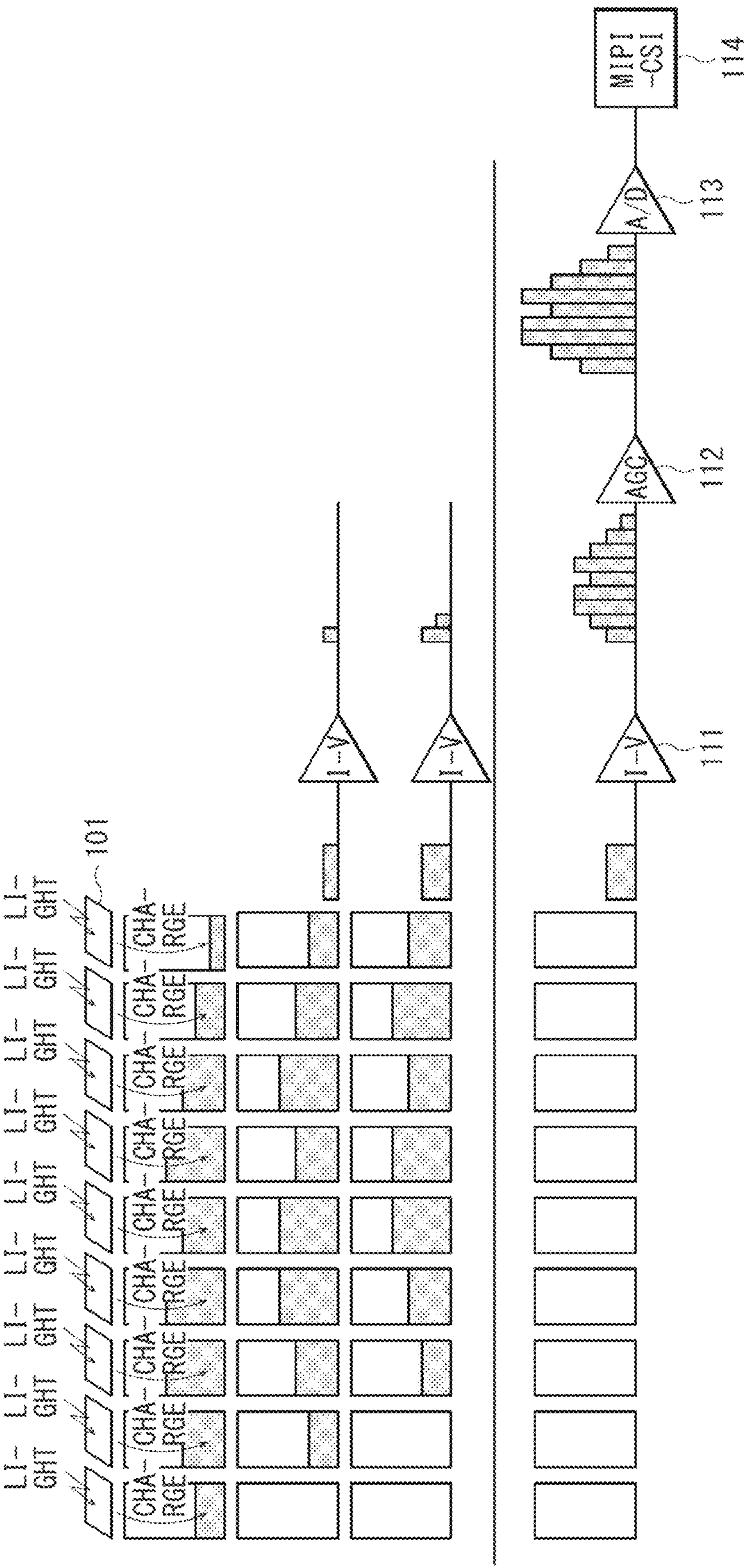
FIG. 2 is an explanatory view schematically illustrating an example of a configuration and operation of a typical imaging circuit.

FIG. 2 schematically illustrates an example of a configuration and operation of a typical imaging circuit. The imaging circuit has been once a main location contaminated with fluctuating noise, but various kinds of approaches for suppressing noise are currently employed.

As illustrated in FIG. 2, charges accumulated in each image pickup device 101 are sequentially converted as currents into voltage signals by an I-V amplifier (current/voltage conversion amplifier) 111. The voltage signal is amplified by an auto gain control (AGC) amplifier 112 according to a set gain, and is converted into a digital signal by an analog/digital (A/D) converter 113.

(Optical Structure and Characteristics of Image Sensor)

FIG. 3 schematically illustrates an example of an optical structure of a typical image sensor.

As a structure of the typical image sensor, for example, a color filter 121, a microlens 122, an optical low-pass filter 123, and an infrared cut filter 124 are provided in the image pickup device 101. The image pickup device 101 is, for example, a photodiode.

A typical camera lens is designed to have a focal point on the assumption of visible light, and entry of infrared light into the typical camera lens is a cause for out-of-focus. The infrared cut filter 124 is provided to eliminate infrared light. An object at a resolution that exceeds a pixel pitch is a cause for occurrence of moire. The optical low-pass filter 123 has the action of slightly scattering light to suppress the occurrence of moire. The microlens 122 improves light-receiving efficiency, and also prevents light incident on each pixel from leaking to an adjacent pixel. The color filter 121 is, for example, a primary color filter that allows passage of only light in a single color of any of three primary colors (red, green, and blue) of light with respect to one pixel and thereby enables capturing of a color image. Note that, at the time of the image pickup device 101 with low sensitivity, a complementary filter has been used as the color filter 121 allowing passage of light in two colors, and a color has been reproduced by execution of a computation. Light that fails to pass the color filter 121 is discarded, and illuminance of light that is available for imaging becomes lower than measurement illuminance.

(Optical Characteristics of Camera Lens)

Focal Length

FIG. 4 schematically illustrates an example of a focal length of an optical lens 130. FIG. 5 schematically illustrates an example of a focal length of a camera lens 131.

The focal length of the camera lens 131 is different in meaning from the focal length of the optical lens 130. As illustrated in FIG. 4, the focal length (=focus) of the optical lens 130 is a distance between the center of the lens and an image formation point on an image plane in a case where parallel light is incident. The focal length of the camera lens 131 is a value obtained by conversion of a distance between the center of the lens and the image sensor (=image plane) into a focal length of a 35 mm film camera, and is used to define an imaging angle of view. FIG. 5 schematically illustrates the concept of a focal length in a case of a wide-angle lens (with a short focal length) and the concept of a focal length in a case of a telephoto lens (with a short focal length).

F-Number

An F-number is a value obtained by division of the focal length of the camera lens 131 by an effective diameter on an object side. The smaller the F-number is, the brighter a lens (that condenses a larger amount of light) is. The wider the angle is (the shorter the focal length is), the smaller the F-number is (the brighter). Additionally, the larger a diameter is (a large-sized camera), the smaller the F-number is (the brighter). Since a dark wide-angle lens has a small diameter and a short overall lens length, it is a small, less expensive lens. Since a bright telephoto lens has a large diameter and a long overall lens length, it is a large, expensive lens.

Depth of Field

FIG. 6 schematically illustrates an example of a depth of field in a case where the camera lens 131 is a small-diameter lens. FIG. 7 schematically illustrates an example of a depth of field in a case where the camera lens 131 is a large-diameter lens.

The depth of field represents a blurring amount on the image plane in a case where an object distance is outside an in-focus position. In a case where the depth of field is deep, blurring is less likely to occur even if the object distance is outside the in-focus position to some extent. In a case where the depth of field is shallow, blurring is likely to occur when the object distance is just a little bit outside the in-focus position. As illustrated in FIG. 6, the smaller diameter the lens has (the darker the lens is), the deeper the depth of field is (blurring is less likely to occur). As illustrated in FIG. 7, the larger diameter the lens has (the brighter the lens is), the shallower the depth of field is (blurring is likely to occur). The bright lens with a large diameter is necessary to be subjected to precise focus control, and is unsuitable for simultaneous capturing of an image of a distant object and an image of a near object.

FIG. 8 schematically illustrates an example of a depth of field in a case where the camera lens 131 is the wide-angle lens and an example of a depth of field in a case where the camera lens 131 is the telephoto lens.

The wider angle the lens has (a short focus lens), the deeper the depth of field is (blurring is less likely to occur). The more telephoto the lens is (a long focus lens), the shallower the depth of field is (blurring is likely to occur). In a case where the image of the distant object and the image of the near object are desired to be simultaneously captured, a lens having a deeper depth of field, that is, a lens having a smaller diameter and having a wider angle, is more advantageous.

(Difference Between Quantization Noise and Quantum Noise)

A term "quantization noise" in digital signal processing is used to express a minute error that is caused when an analog signal represented by a continuous quantity is digitized and that is less than one bit. It is to be noted that "quantum noise" that should be solved by the technique according to one embodiment is attributable to quantum-mechanical properties of a photon, and is an entirely different concept. The photon is, in physics terms, a "quantum" having both a property as a particle and a property as a wave motion. The "wave motion" is interpreted as having a property of a wave regarding an existence probability of photons. That is, according to the existence probability of photons, photons are subjected to wave refraction, and "stochastically" reach the image pickup device 101. Thus, the number of photons that are detected by the image pickup device 101 fluctuates according to a probability distribution and is not constant. Noise that is generated accordingly in an image signal is the quantum noise.

(Quantum-Mechanical Properties of Photon)

Light has two prominent parameters: a color and brightness.

The color is determined by energy of the photon. The energy of the photon is proportional to a frequency, and is expressed by $E=h \cdot v$, where h represents a Planck constant$=6.62607015^{-34}$ (J·s), v represents a frequency of light=(speed of light/wavelength), and E represents energy (J) of the photon. When a wavelength $\lambda$ of light is 555 nm (yellowish green), E is $3.57918^{-19}$ (J).

The brightness is determined by the number of photons. The number of photons is expressed by (light irradiation energy)/(energy of photons). When illuminance is 1 lux, light irradiation energy per 1 $m^2$ is 0.00146 (J/s) (when) is 555 nm). This means that $4.07914^{+15}$ photons reach to an area of 1 $m^2$ per second.

(Illuminance and Characteristics of Variations in Number of Photons (Poisson distribution))

Figure 9:
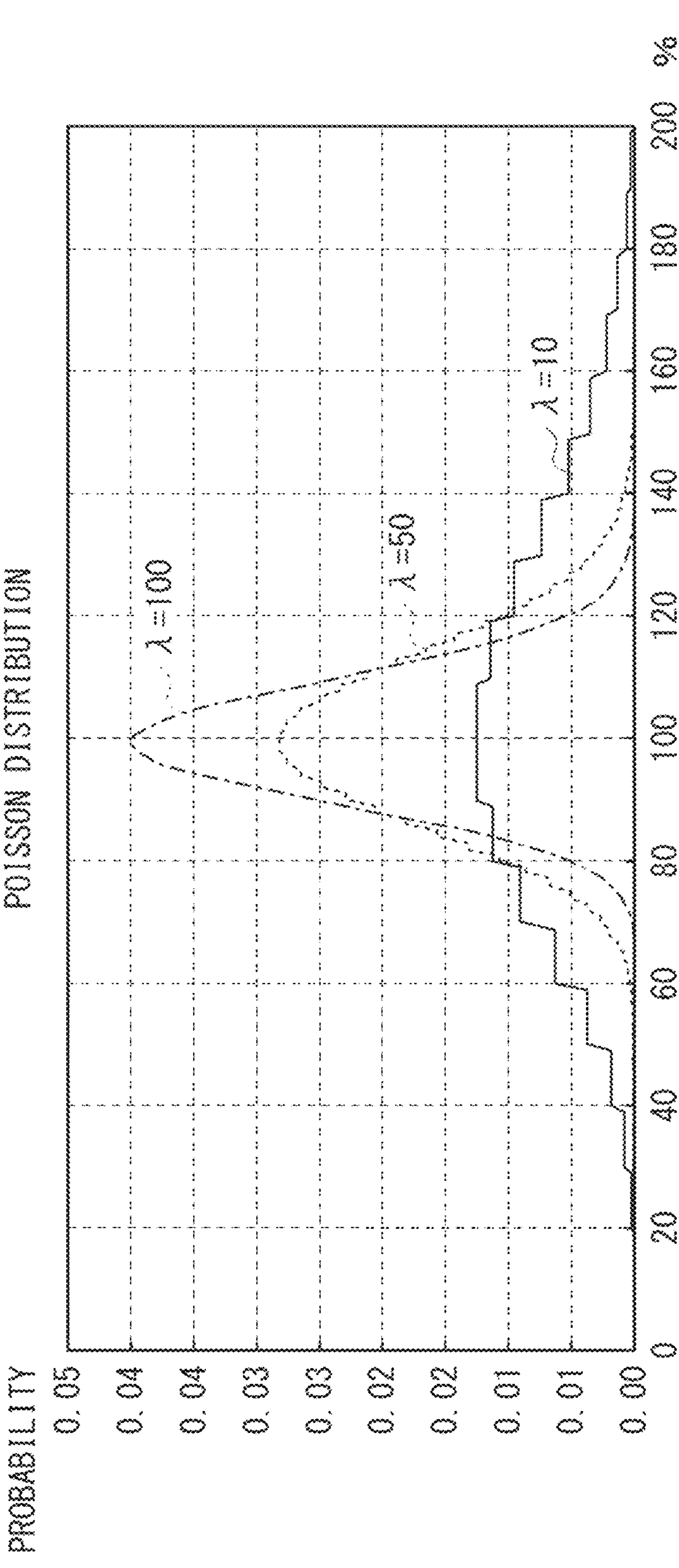
FIG. 9 is an explanatory view illustrating an example of characteristics of variations in the number of photons that reach an image pickup device.

FIG. 9 illustrates an example of characteristics of variations in the number of photons that reach the image pickup device 101.

It is known that, when a completely random event occurs a few times, an occurrence probability of the event follows a Poisson distribution, and when the event occurs with high frequency, the occurrence probability of the event is approximated to a normal distribution. When converted into a pixel size (1.12 μm) of a standard camera, the number of photons per pixel is 5.177 at 1 lux on the image sensor, and corresponds to 153 per 30 ms, which falls below 8 bits=256-level grayscale. This is in a case of maximum luminance at 1 lux where only several tens of photons to several photons reach per one pixel depending on grayscale for expressing an image, which is within an appropriate range of the Poisson distribution. FIG. 9 illustrates a probability distribution in which photons whose number $\lambda$ is 10, 50, and 100 reach one pixel. The smaller the number of photons $\lambda$ is, the larger the dispersion is. That is, the darker the object is, the lower the probability of photons reaching one pixel becomes, and the larger noise becomes.

(Method of Controlling Exposure of Camera)

Methods of capturing an image of a dark object as a bright image are broadly divided into two types: shutter speed priority control and gain priority control.

Shutter Speed Priority Control

Figure 10:
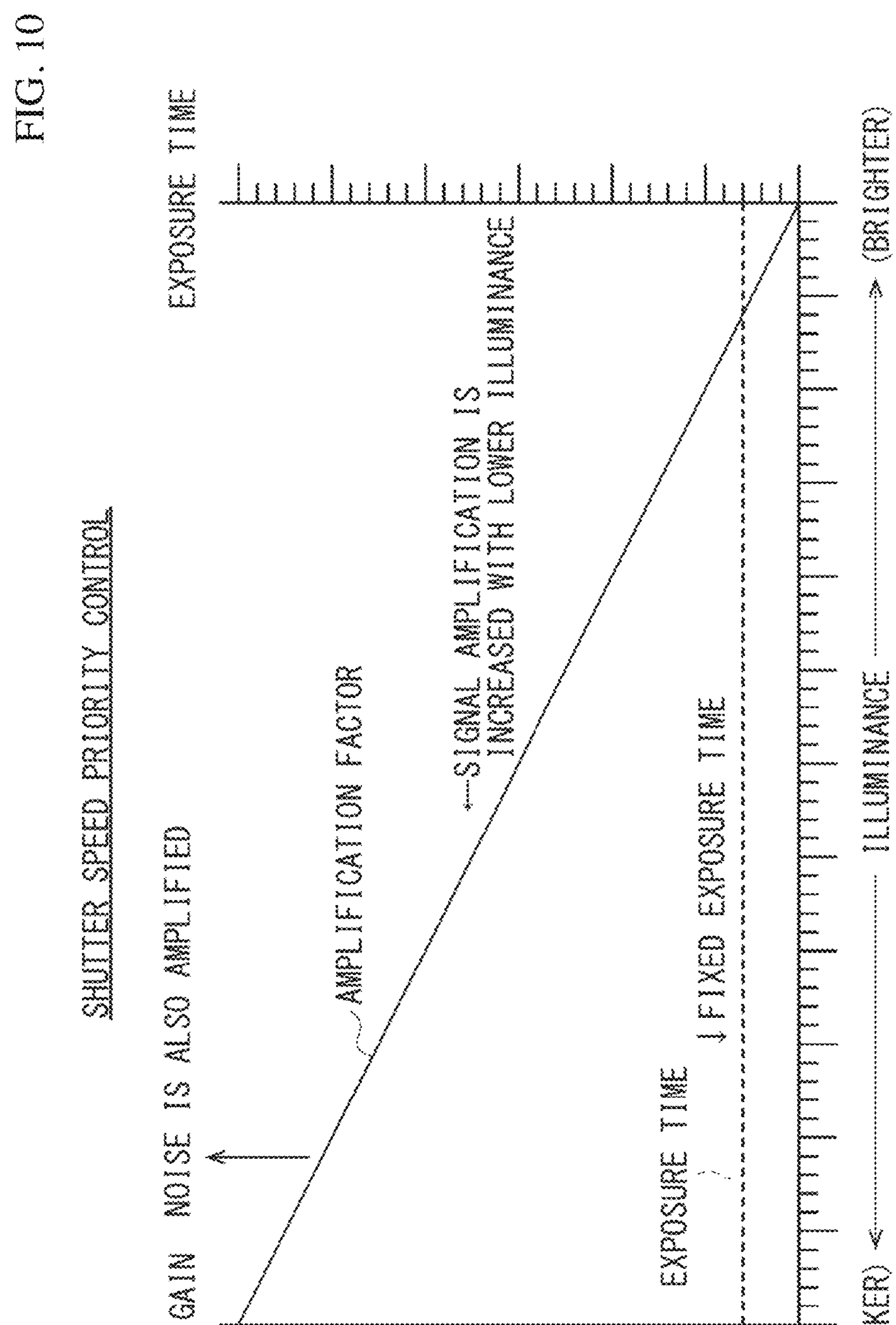
FIG. 10 is an explanatory view schematically illustrating an example of exposure control that prioritizes shutter speed.
Figure 11:
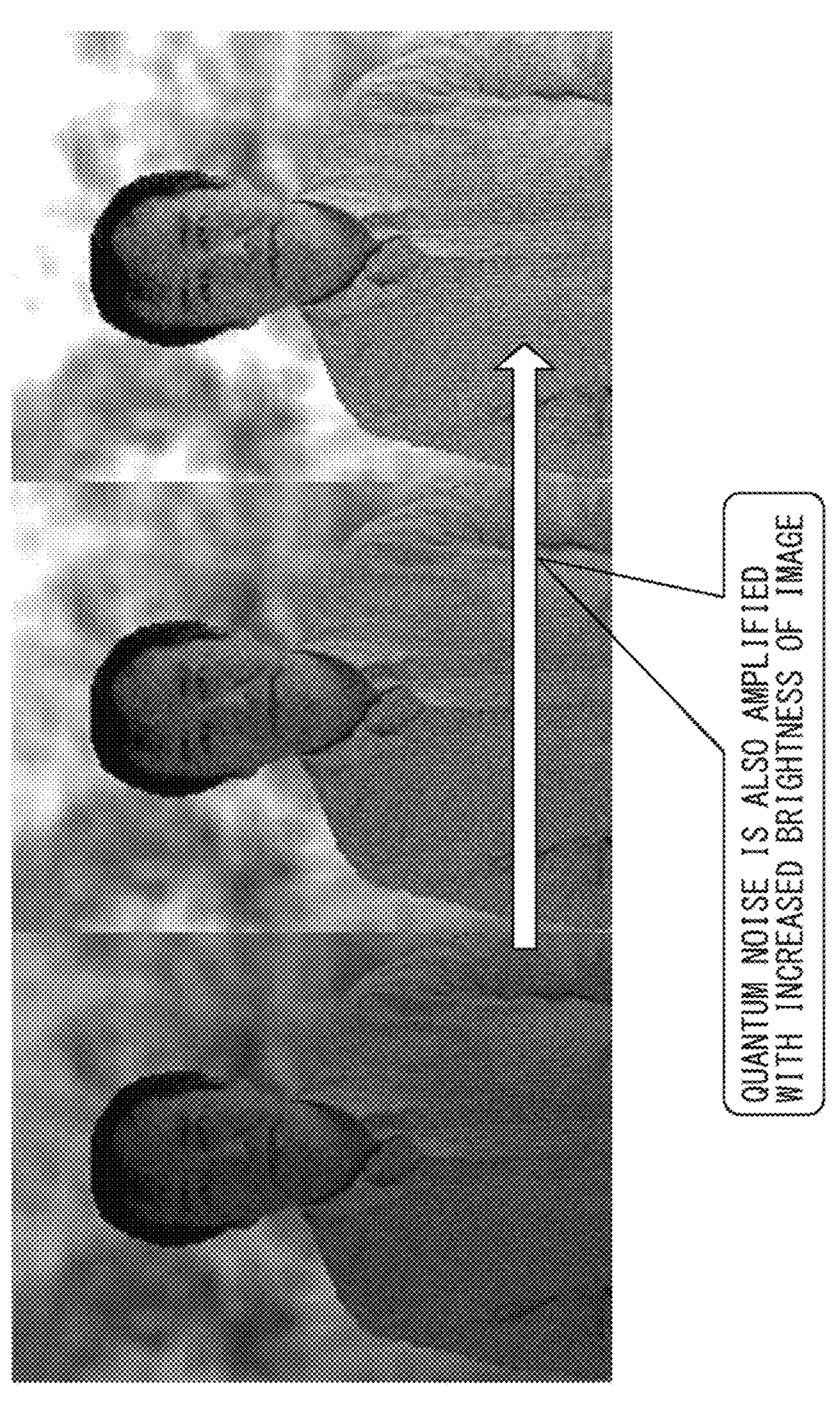
FIG. 11 is an explanatory view schematically illustrating an example of a captured image in a case where the exposure control that prioritizes shutter speed is performed.

FIG. 10 schematically illustrates an example of exposure control that prioritizes shutter speed (shutter speed priority control). FIG. 11 schematically illustrates an example of a captured image in a case where the exposure control that prioritizes shutter speed is performed.

The shutter speed priority control is generally applied to capturing of an image of a moving object. The shutter speed priority control is, as illustrated in FIG. 10, control to brighten an image by the AGC amplifier 112 changing an amplification factor (gain) of a signal according to illuminance while maintaining (fixing) a setting of exposure time (shutter speed) regardless of illuminance to increase the amplification factor of the signal more as the object becomes darker. In a case of the shutter speed priority control, as illustrated in FIG. 11, the increase of the amplification factor of the signal increases luminance of an image and also amplifies quantum noise.

Gain Priority Control

Figure 12:
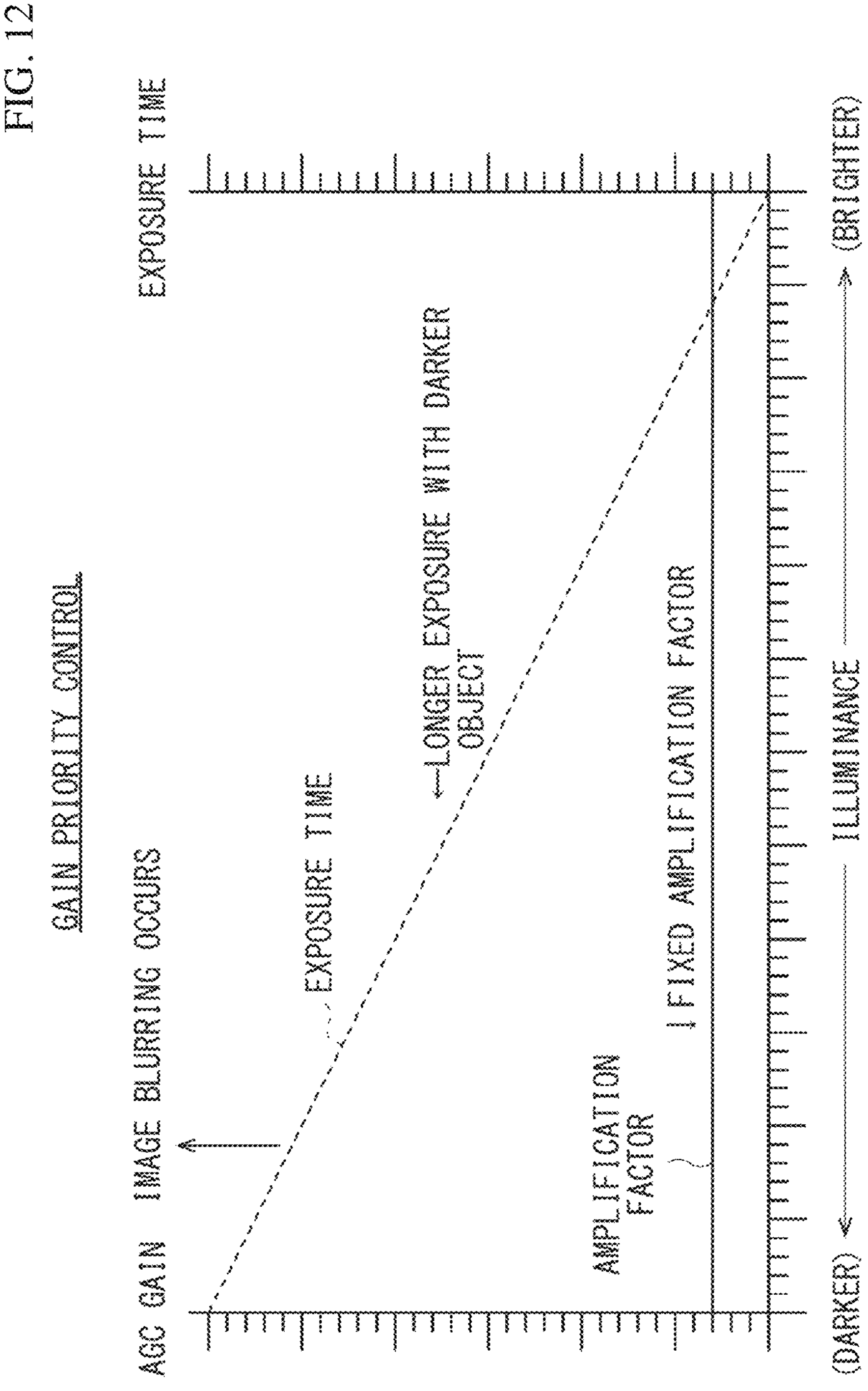
FIG. 12 is an explanatory view schematically illustrating an example of exposure control that prioritizes a gain.
Figure 13:
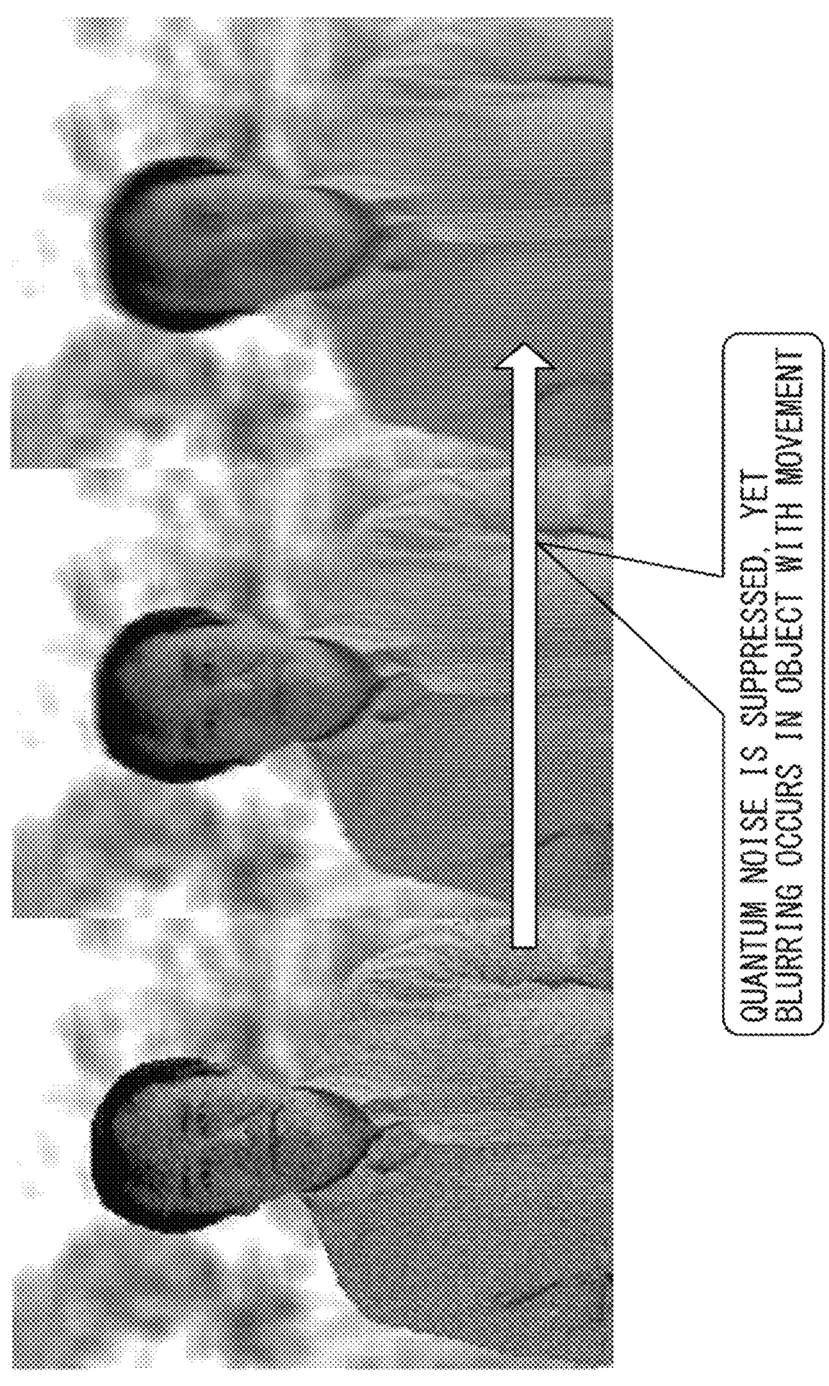
FIG. 13 is an explanatory view schematically illustrating an example of a captured image in a case where the exposure control that prioritizes a gain is performed.

FIG. 12 schematically illustrates an example of exposure control that prioritizes a gain (gain priority control). FIG. 13 schematically illustrates an example of a captured image in a case where the exposure control that prioritizes a gain is performed.

The gain priority control is generally applied to an object with little movement. The gain priority control is, as illustrated in FIG. 12, control to brighten an image by the AGC amplifier 112 changing exposure time (shutter speed) according to illuminance while maintaining (fixing) the amplification factor of the signal regardless of illuminance to perform longer exposure as the object becomes darker and thereby accumulate photons. In a case of the gain priority control, as illustrated in FIG. 13, quantum noise is suppressed, but blurring occurs in an object with movement.

Balance Control

Figure 14:
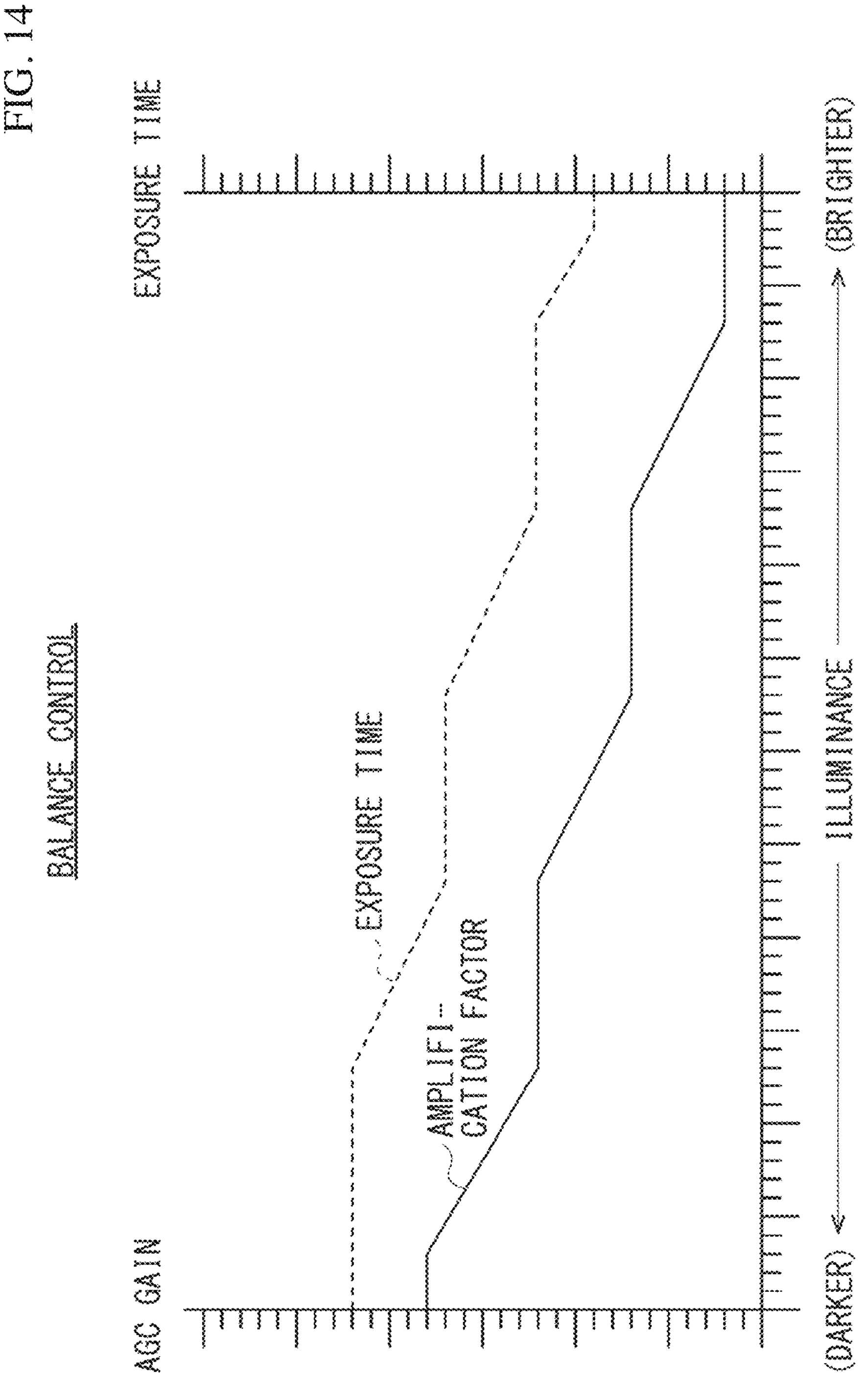
FIG. 14 is an explanatory view schematically illustrating an example of exposure control that strikes a balance between shutter speed and a gain.

FIG. 14 schematically illustrates an example of exposure control that strikes a balance between shutter speed and a gain (balance control).

For example, in a case where an image of a bright object is captured or an image is captured with a bright lens (with a large F-number), as illustrated in FIG. 14, alternatively performed is control of exposure time (shutter speed) according to illuminance and control of the amplification factor (gain) of the signal by the AGC amplifier 112, whereby auto exposure (AE) control to optimize an exposure condition is performed. Note that in a high-end camera on which a large-diameter lens is mounted, the F-number may be further decreased with a diaphragm mechanism, or a neutral density (ND) filter may be mounted to attenuate incident light in some cases. However, in a case where an image of a dark object is captured with a small-diameter lens, there is not such a margin.

(Relationship between Speed of Object and Exposure Time)

Figure 15:
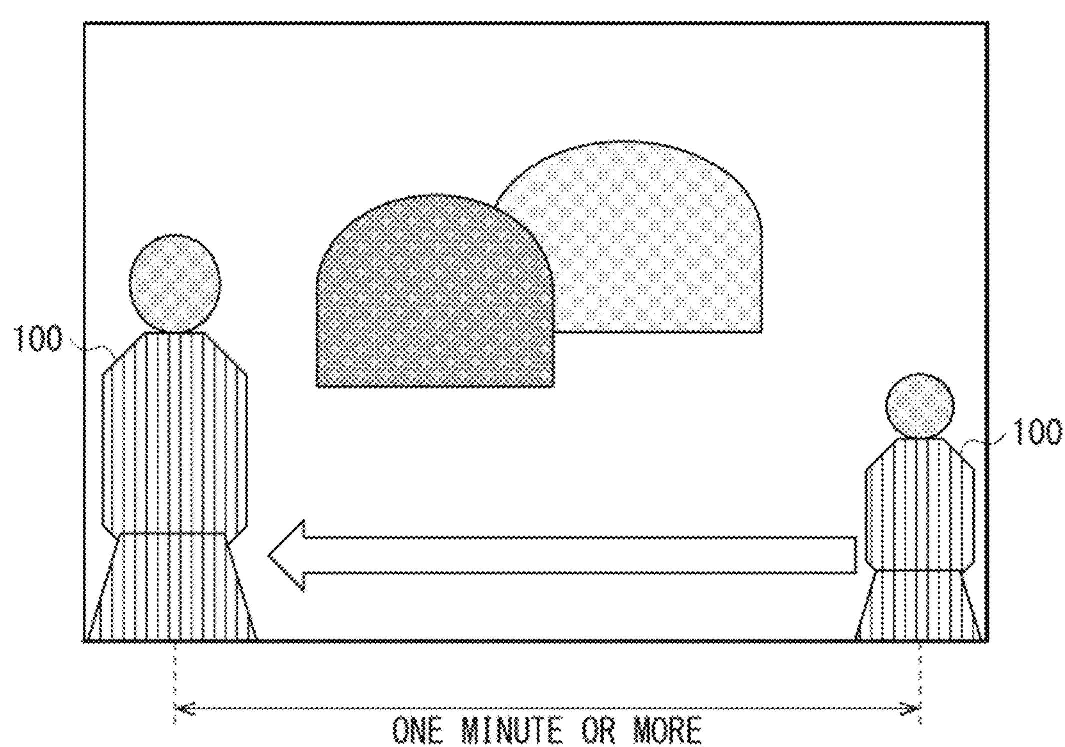
FIG. 15 is an explanatory view schematically illustrating an example of a relationship between speed of an object and exposure time.

FIG. 15 schematically illustrates an example of a relationship between speed of an object and exposure time.

As illustrated in FIG. 15, in a case where an image of a moving object 100 is captured, it is necessary to decrease exposure time so as to prevent occurrence of image blurring. For example, in a case where imaging is performed with an image sensor with a horizontal resolution of 2048 pixels for exposure time of 30 ms (a maximum value in capturing of moving images), permitted moving speed to suppress image blurring within one pixel is 33.3 pixels per second or less, that is, time taken for an object to come across a horizontal angle of view is one minute or more.

(Illuminance, Exposure Time, and Quantum Noise)

Figure 16:
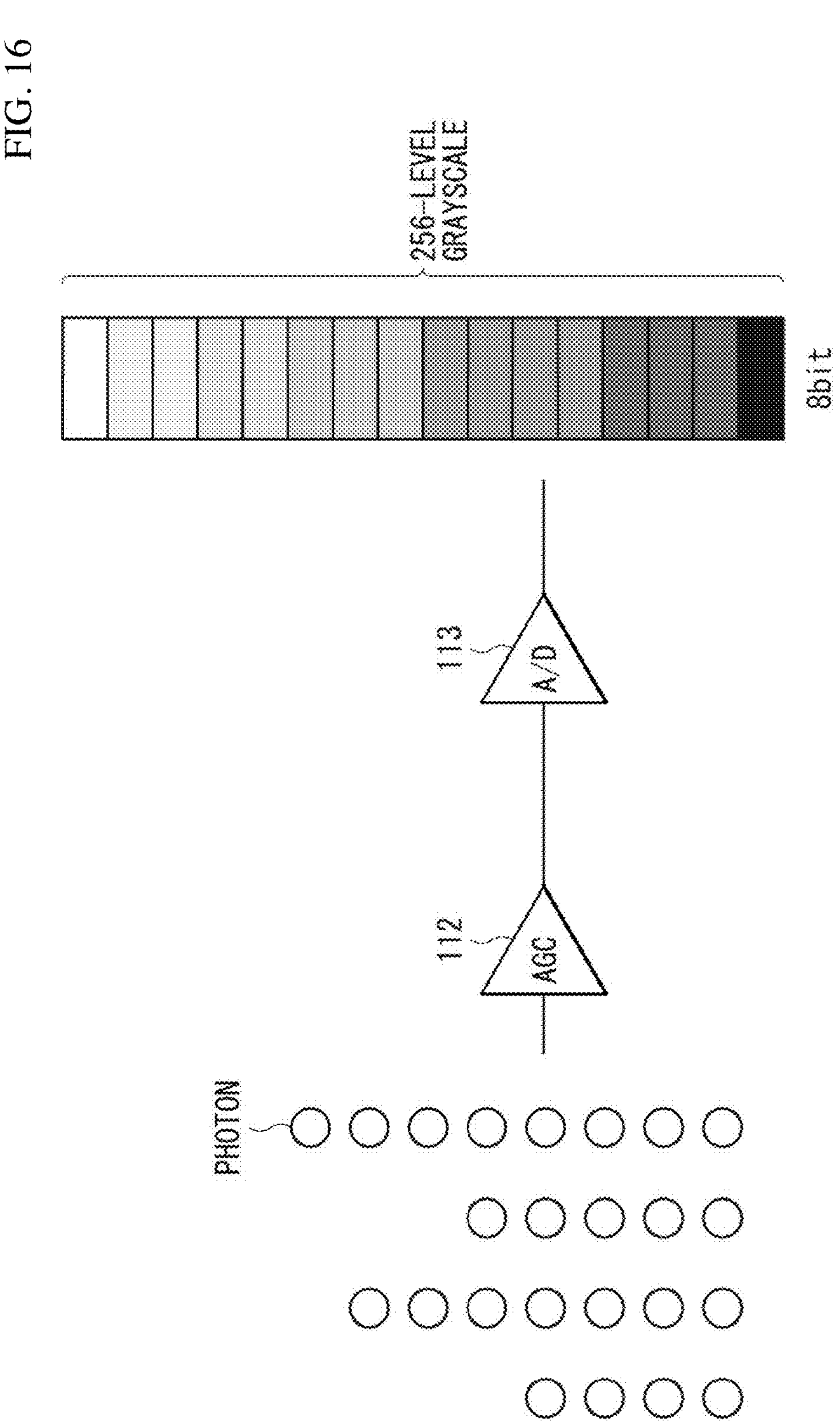
FIG. 16 is an explanatory view illustrating generation of quantum noise.

FIG. 16 illustrates generation of quantum noise.

In a case where exposure time is restricted in capturing of an image of an object with movement, it is necessary for the AGC amplifier 112 to increase the amplification factor (gain) of the signal under a low illuminance environment to ensure a level of a signal input to the A/D converter 113. At low illuminance of several luxes or less on the light-receiving surface of the image sensor, sufficient photons that satisfy 8 bits=256-level grayscale do not gather, and quantum noise attributable to photon's probability waves is generated.

[1.2 Issues and Comparative Example]

In photography, appropriate exposure time is generally predicted and set before imaging is performed. As compared with the era of silver halide photography, it has become possible to instantly check a result of imaging with a modern electron camera, and furthermore, AE control to automatically perform from photometry to exposure setting has become common. However, as described above, it is impossible to solve contradictory issues of noise and image blurring in imaging at low illuminance, and it is difficult to make settings of an exposure condition depending on a purpose.

To address this, it is desirable to provide an image processing apparatus and an imaging system that enable generation of an image in which each of noise and image blurring is suppressed in a desired exposure state after imaging. For example, for an application purpose of object authentication, especially for an application purpose of face authentication, there is a demand for a technique that enables setting of an exposure condition after imaging and that enables significant improvement of setting of exposure control.

(Difference from HDR)

A description is given of a difference between the technique according to one embodiment, which will be described later, and a technique of a high dynamic range (HDR) as a comparative example.

HDR as Number of Bits to Express

FIG. 17 illustrates an outline of the HDR as the number of bits to express.

In a digital image, brightness of each pixel has been expressed with 8 bits=256-level grayscale since early times. As multiple-level grayscale expression becomes available with increased performance of image apparatuses, there has been a demand for higher image quality. To meet the demand, image dynamic range extension specifications such as 10 bits=1024-level grayscale and 12 bits=4096-level grayscale have appeared (dynamic range=an expression range from a minimum signal to a maximum signal). However, as illustrated in FIG. 17, if the number of photons does not satisfy the number of grayscale levels in the first place, it is difficult to deliver performance.

HDR as Image Combination

Figure 18:
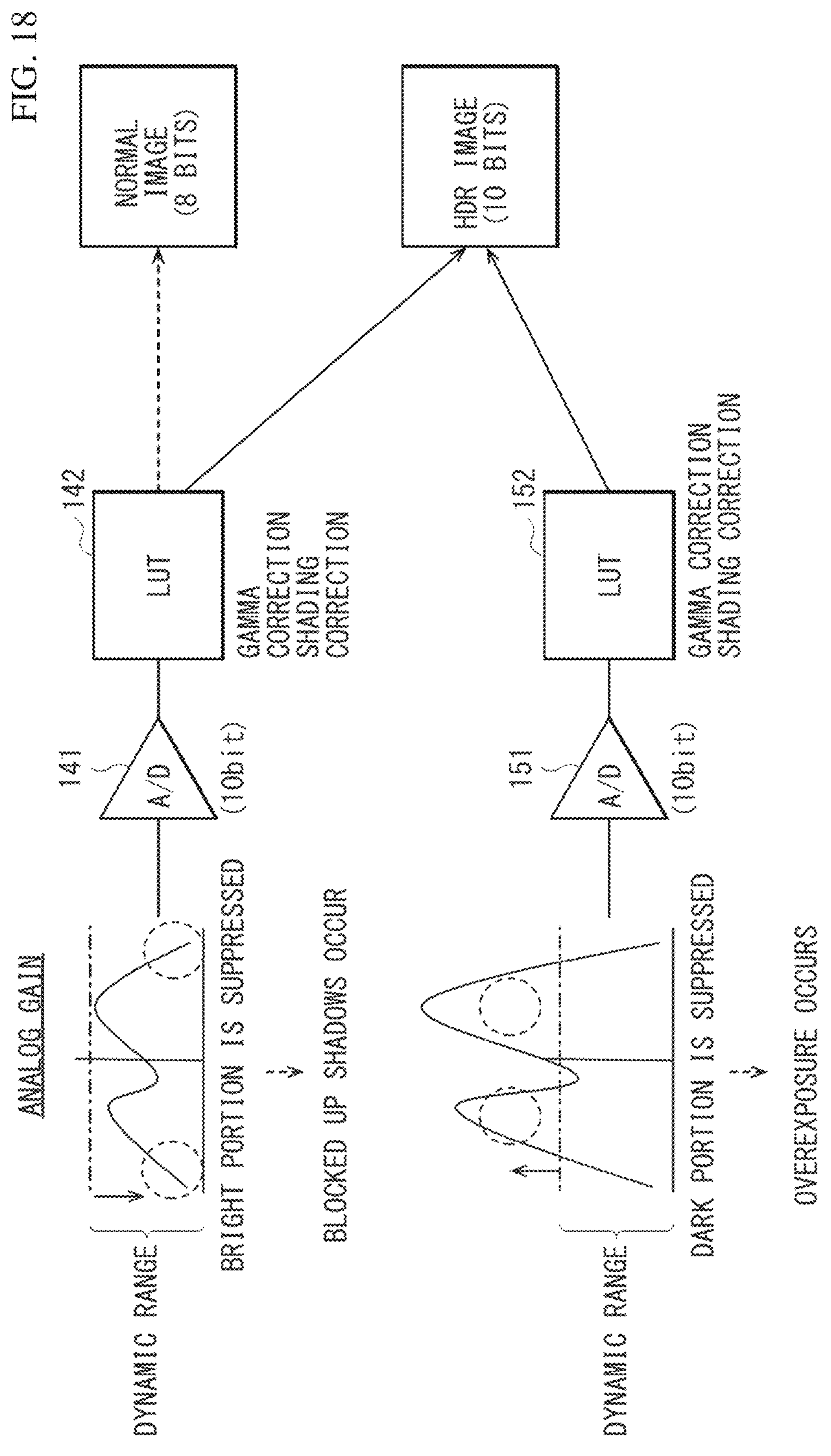
FIG. 18 is an explanatory view illustrating an outline of the HDR as image combination.

FIG. 18 illustrates an outline of the HDR as image combination.

The HDR as image combination is a method of switching an analog gain to combine a plurality of pieces of continuously captured image data, and extending a dynamic range. For example, as illustrated in FIG. 18, a first analog signal obtained by an analog gain set to suppress a bright portion is converted to a first digital signal (for example, 10 bits) by an analog/digital (A/D) converter 141. Furthermore, gamma correction or shading correction is performed with a lookup table (LUT) 142 to obtain a first image. The first image may be a normal image (for example, 8 bits) whose dynamic range is not extended.

In contrast, a second analog signal obtained by an analog gain set to emphasize a dark portion is converted to a second digital signal (for example, 10 bits) by an A/D converter 151. Furthermore, gamma correction or shading correction is performed with a LUT 152 to obtain a second image. Since the bright portion is suppressed in the first image, there is a case where blocked up shadows occur in a portion of the first image. In contrast, since the dark portion is emphasized in the second image, there is a case where overexposure occurs in a portion of the second image. By combining the first image and the second image so as to eliminate the portion in which blocked up shadows occur and the portion in which overexposure occurs, it is possible to obtain a HDR image (for example, 10 bits) whose dynamic range is extended.

(Example of HDR Image as Image Combination)

Figure 19:
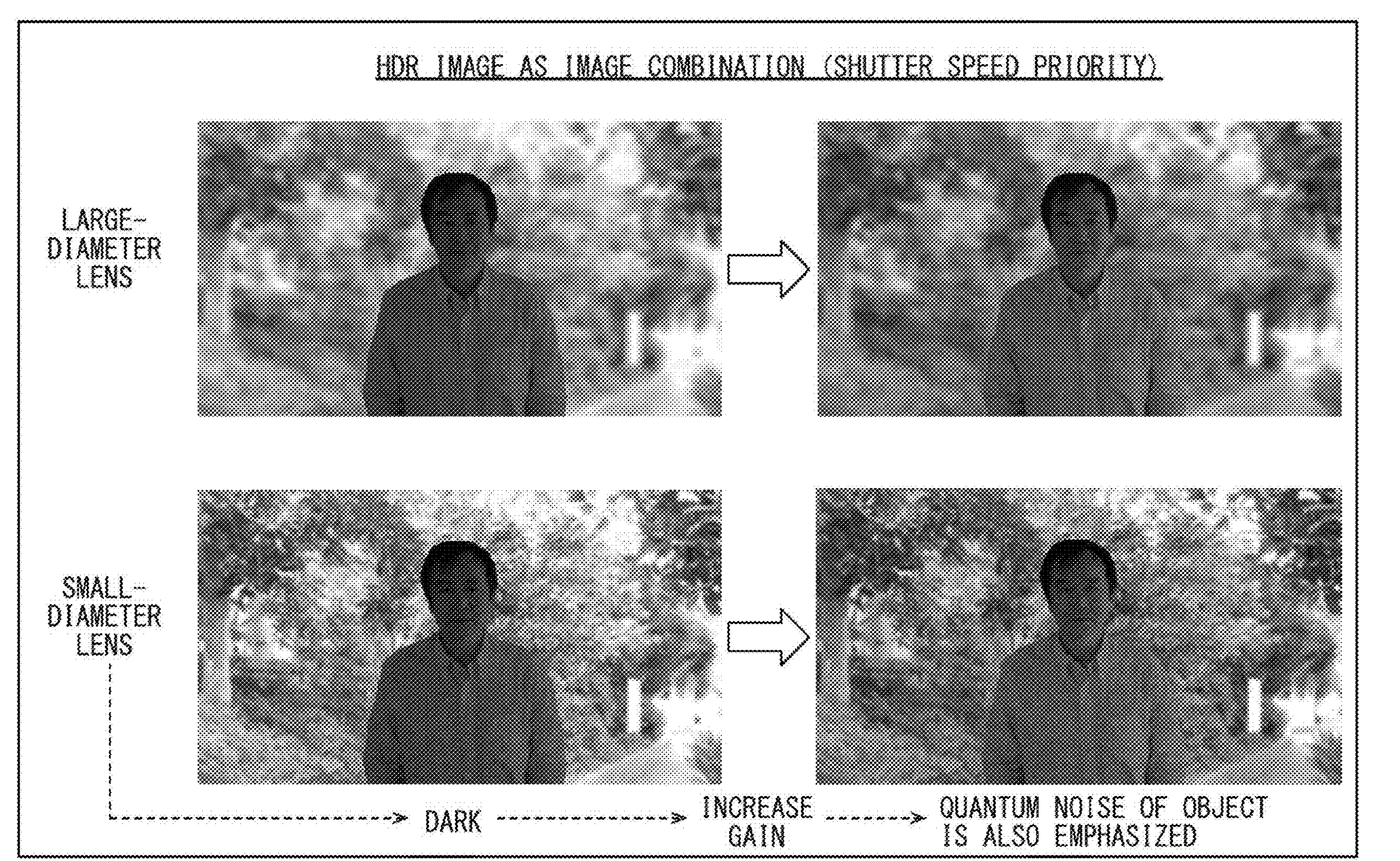
FIG. 19 is an explanatory view illustrating an example of a HDR image generated on the basis of images obtained by the exposure control that prioritizes shutter speed.
Figure 20:
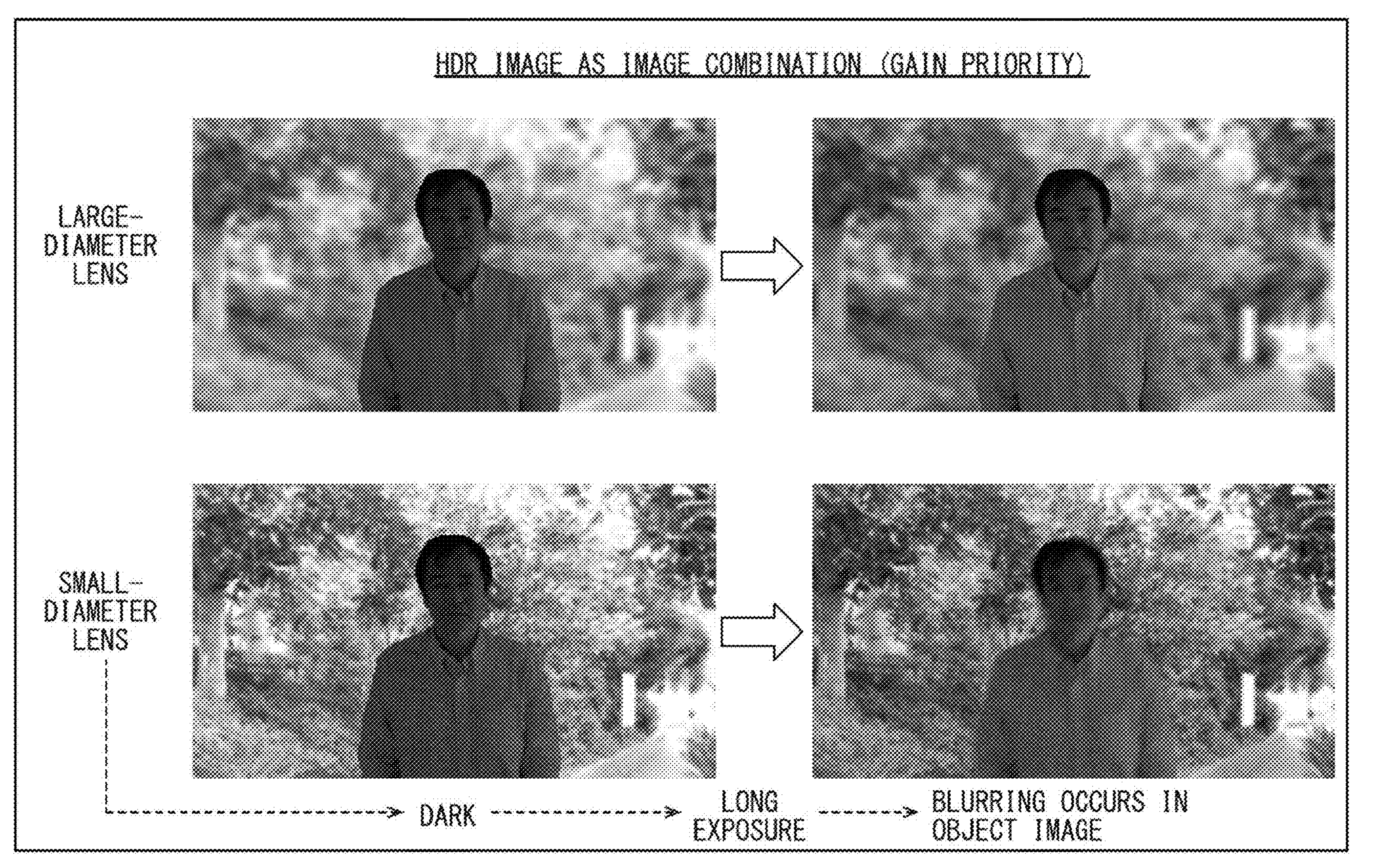
FIG. 20 is an explanatory view illustrating an example of a HDR image generated on the basis of images obtained by the exposure control that prioritizes a gain.

FIG. 19 illustrates an example of a HDR image generated on the basis of an image obtained by the exposure control that prioritizes shutter speed (shutter speed priority control). FIG. 20 illustrates an example of a HDR image generated on the basis of an image obtained by the exposure control that prioritizes a gain (gain priority control). FIGS. 19 and 20 each illustrate an example of a HDR image generated on the basis of an image captured with the large-diameter lens, and an example of a HDR image generated on the basis of an image captured with the small-diameter lens.

In a HDR image obtained by image combination, in a case where a light amount is insufficient in a dark portion and a signal is amplified, quantum noise is prominent. Additionally, the movement of an object during continuous imaging may result in erroneous combination. For example, as illustrated in FIG. 19, especially in a HDR image generated on the basis of an image captured with the small-diameter lens under the shutter speed priority control, an increase in gain results in emphasis of quantum noise in the object image. Additionally, for example, as illustrated in FIG. 20, especially in a HDR image generated on the basis of an image captured with the small-diameter lens under the gain priority control, blurring occurs in the object image due to long time exposure.

(Example of Exposure Image Generated by Technique According to One Embodiment)

Figure 21:
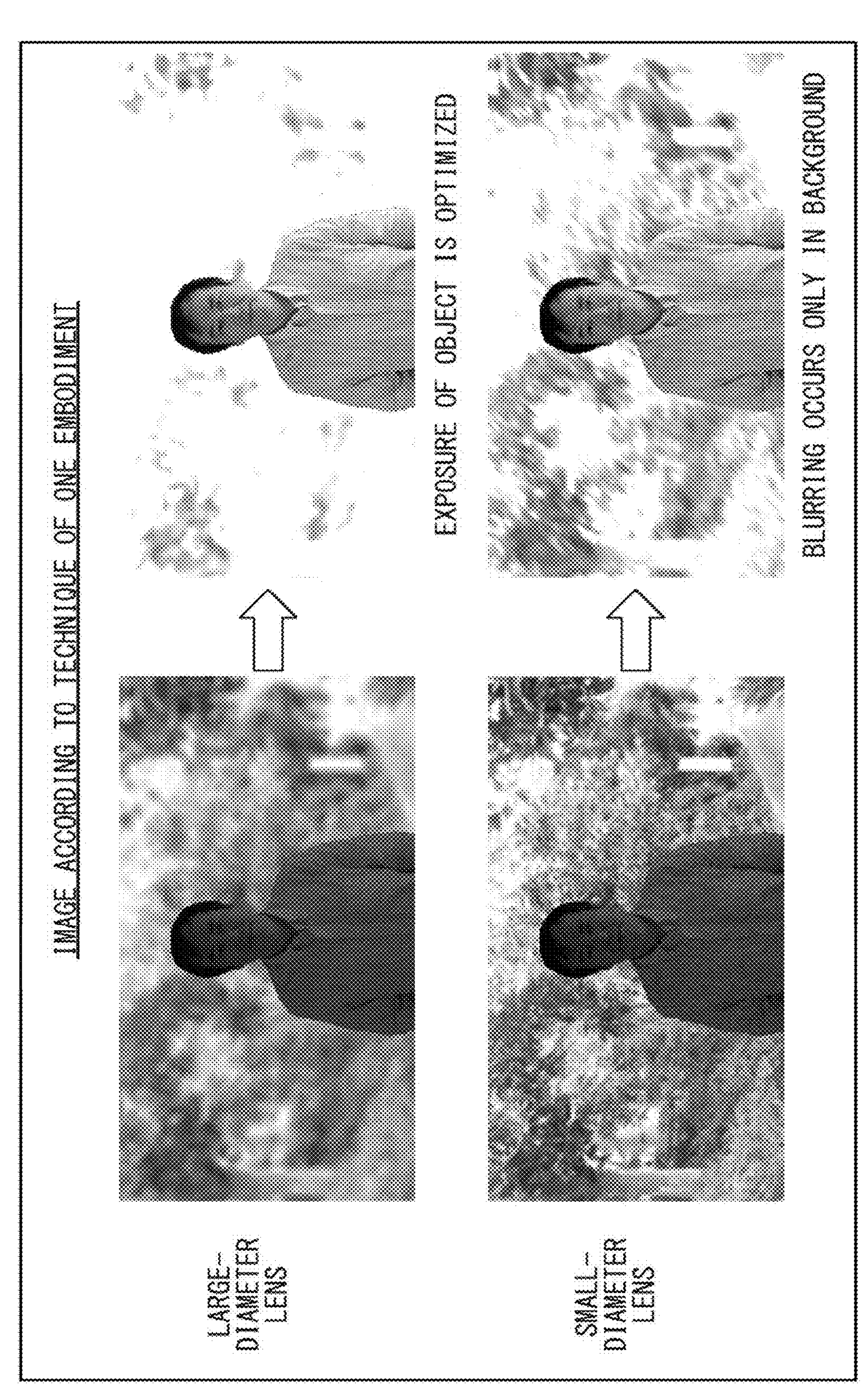
FIG. 21 is an explanatory view illustrating an example of an image obtained by a technique according to one embodiment of the present disclosure.

FIG. 21 illustrates an example of an image obtained by a technique according to one embodiment of the present disclosure. FIG. 21 illustrates an example of an exposure image generated on the basis of an image captured with the large-diameter lens, and an example of an exposure image generated on the basis of an image captured with the small-diameter lens.

In a case where the technique according to one embodiment is applied, for example, an exposure state of the object is optimized both in the exposure image generated on the basis of the image captured with the large-diameter lens, and the exposure image generated on the basis of the image captured with the small-diameter lens. Note that, for example, in the exposure image generated on the basis of the image captured with the small-diameter lens, image blurring occurs only in the background of the object.

(Optical Image Stabilization)

Additionally, as a technique of suppressing image blurring in a case where imaging is performed with a camera in hand, there is an optical image stabilization technique. For example, an acceleration sensor and a gyro sensor are mounted on the camera. Additionally, an optical actuator that changes an imaging optical path is mounted on a camera lens. A change in orientation of the camera is measured with the acceleration sensor and the gyro sensor. The optical actuator is driven in a direction cancelling out an amount of the measured change in orientation. With this configuration, it is possible to suppress image blurring attributable to the change of the orientation of the camera. However, it is difficult to suppress image blurring attributable to a motion of the object.

To address this, PTL 1 (Japanese Patent Application Laid-Open No. 2004-357040) proposes a technique of detecting a motion vector of a feature point with the least movement among a plurality of continuously captured images, aligning respective positions in the images, and combining the images. However, the technique described in PTL 1 is, for example, a technique of applying an exposure condition measured by half-pressing of a shutter button in an object observation phase to an imaging phase in which the shutter button is fully pressed, and is not directed to optimization of an exposure condition in an actual imaging phase. Hence, for example, especially in a case where face authentication is performed, the technique lacks in performance for a purpose such as capturing of an image of the face corresponding to a walking motion in a dark place.

(Object Tracking)

Examples of a technique of capturing an image of a moving object with long exposure include object tracking. Examples of the object tracking include, in capturing of images of a track and field athlete, a method of installing a rail in parallel with a track, placing a dolly on which a camera is mounted on the rail, and causing the dolly to run beside the track and field athlete. Other examples of the object tracking include, in capturing of images of a dark astronomical object such as a nebula, a method of mounting a camera on a motor-driven equatorial telescope and causing the camera to track a diurnal motion of the astronomical object. Such a method enables suppression of image blurring even in a case where an object is moving. However, an apparatus that moves a camera in conjunction with the object tends to increase in size, and has a difficulty to track unpredictable movement such as an action of a human.

[1.3 Configuration and Operation]

(Outline)

Figure 22:
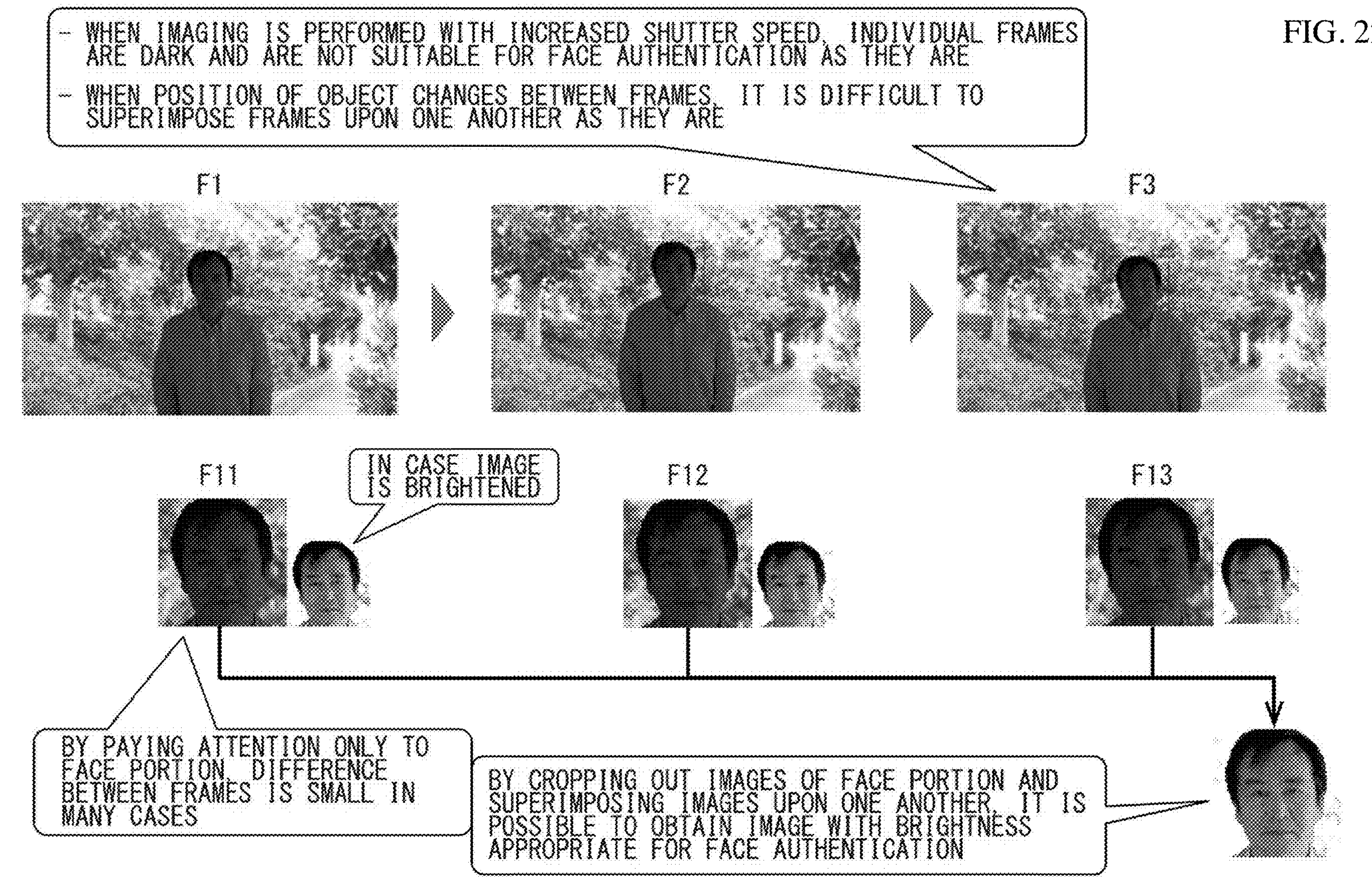
FIG. 22 is an explanatory view illustrating an example of an image obtained by a technique according to one embodiment of the present disclosure.

FIG. 22 illustrates an example of an image obtained by a technique according to one embodiment of the present disclosure.

In the technique according to one embodiment, for example, detected is the change amount of the desired object image in the plurality of images continuously captured in standard exposure time. Subsequently, the desired object image is cropped out from each of the plurality of captured images, and the plurality of corrected images in which a change of the desired object image is corrected is generated. The plurality of corrected images is then combined, and a highly accurate exposure image in a desired exposure state is generated.

For example, in a case where face authentication is performed and an image of the desired object (for example, the face of an authentication target) including the background is captured with increased shutter speed as illustrated in FIG. 22, individual frames F1, F2, and F3 are dark, and are not suitable for the face authentication as they are. Additionally, in a case where the position of the desired object changes between the frames F1, F2, and F3, it is difficult to superimpose the frames F1, F2, and F3 upon one another as they are. However, in many cases, by paying attention only to a desired object portion (for example, a face portion), a difference among the frames F1, F2, and F3 is small. Thus, by cropping out respective images of the desired object portion and superimposing cropped images F11, F12, and F13 upon one another, it is possible to obtain an image with brightness that is appropriate for face authentication. Note that FIG. 22 illustrates respective images that are brightened from the cropped images F11, F12, and F13 for reference. For example, in a case where the images are brightened by signal processing without superimposition of the cropped images F11, F12, and F13, noise is generated.

(Application Example)

The technique according to one embodiment is preferably applied to, for example, a face authentication system. However, the technique according to one embodiment is also applicable to an application purpose other than the face authentication system.

Figure 23:
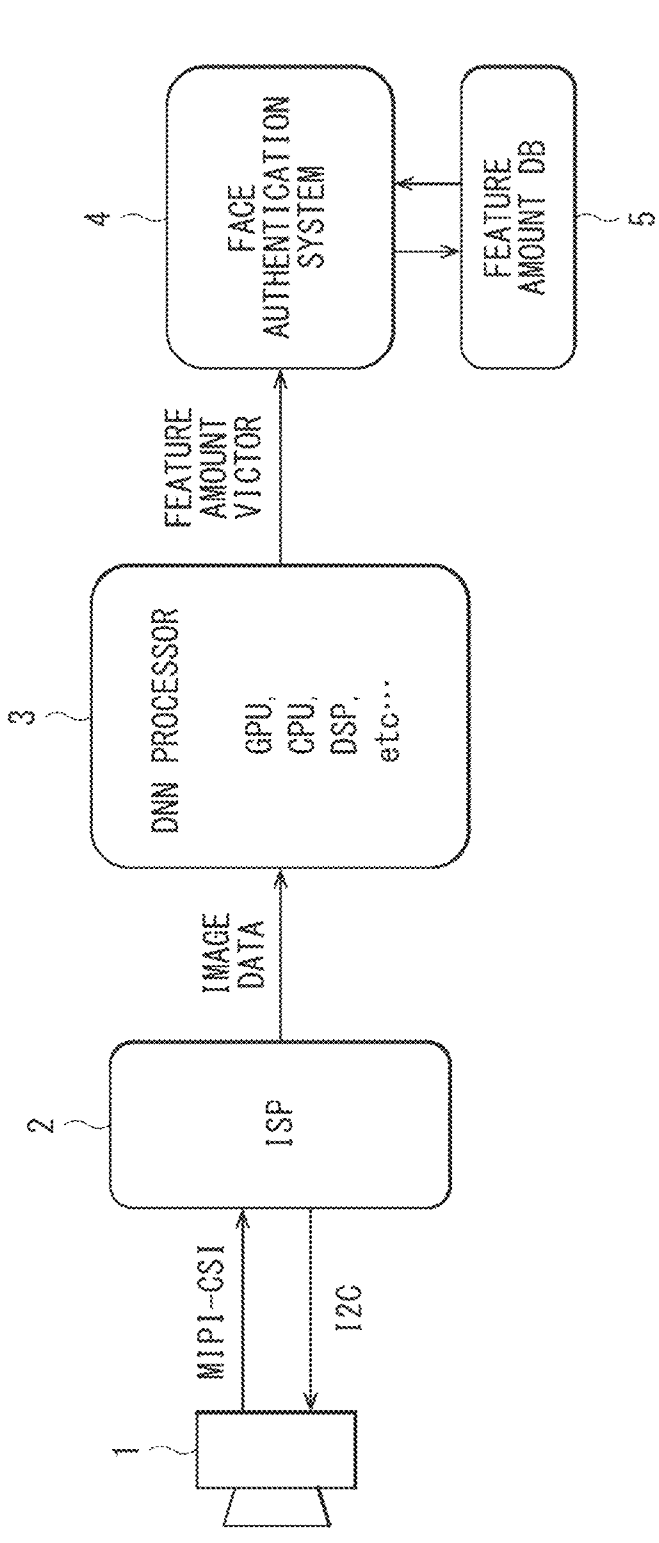
FIG. 23 is a block diagram schematically illustrating a configuration example in which an image processing apparatus and an imaging system according to one embodiment of the present disclosure are applied to a face authentication system.

FIG. 23 schematically illustrates a configuration example in which the image processing apparatus and the imaging system according to one embodiment of the present disclosure are applied to the face authentication system.

The system includes a camera device 1, an image signal processor (ISP) 2, a deep neural network (DNN) processor 3, a face authentication system 4, and a feature amount database (DB) 5. The camera device 1 and the ISP 2 are communicably coupled to each other via, for example, an interface such as a mobile industry processor interface (MIPI)-camera serial interface (CSI) or an inter-integrated circuit (I2C) interface.

A captured image (raw data) captured by the camera device 1 is output to the ISP 2 via, for example, the MIPI-CSI.

The ISP 2 performs gamma correction, color conversion, or the like on the raw data to generate image data, and outputs the image data to the DNN processor 3.

The DNN processor 3 detects a face region as a desired object region in the image data and extracts a face image. Additionally, the DNN processor 3 generates a feature amount vector from the face image, and outputs the feature amount vector to the face authentication system 4. The DNN processor 3 includes, for example, at least one of a graphics processing unit (GPU), a central processing unit (CPU), a digital signal processor (DSP), or the like.

The face authentication system 4 collates the received feature amount vector with registration data in the feature amount DB 5, and performs face authentication to perform personal identification.

The image processing apparatus according to one embodiment is implementable by, for example, the DNN processor 3. The imaging system according to one embodiment is implementable by, for example, the camera device 1, the ISP 2, and the DNN processor 3. An image processing technique implemented by the image processing apparatus and the imaging system according to one embodiment is applicable to, for example, processing of detecting the face region from the image data and extracting the face image as pre-processing prior to generation of the feature amount vector in the DNN processor 3.

(Specific Configuration Example and Operation Example)

Figure 24:
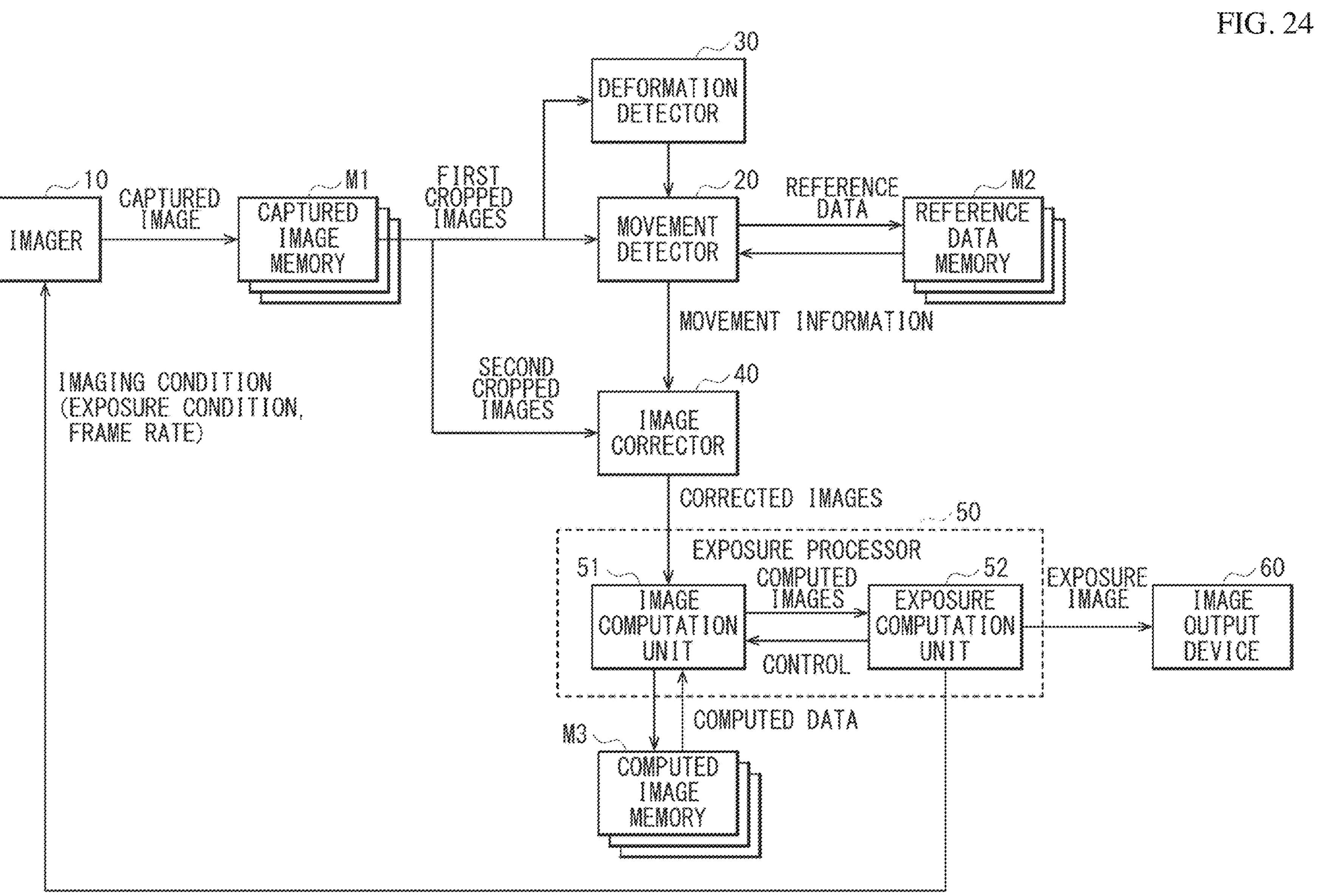
FIG. 24 is a block diagram illustrating an outline of the image processing apparatus and the imaging system according to one embodiment.
Figure 25:
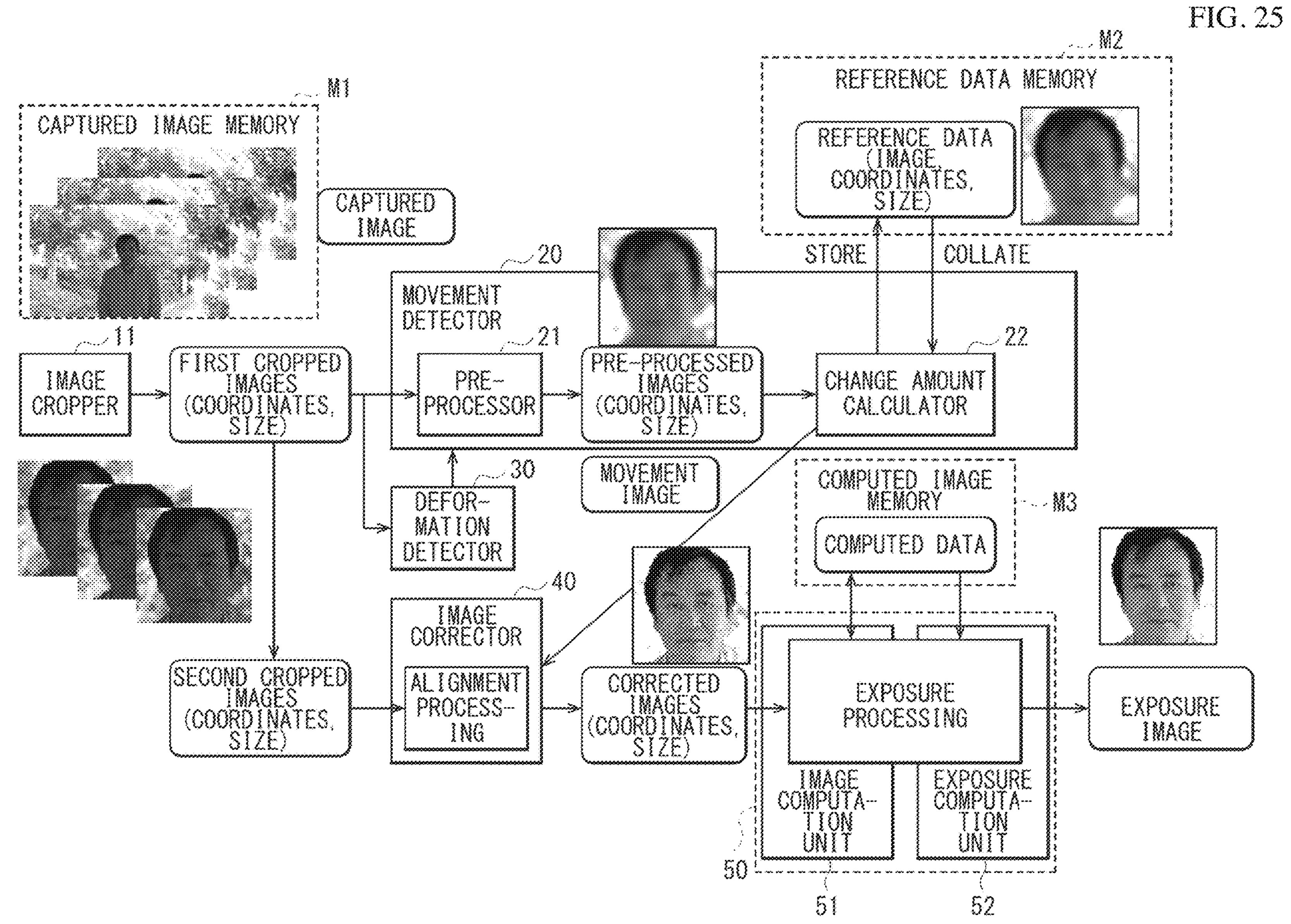
FIG. 25 is a block diagram schematically illustrating a detailed configuration example of the image processing apparatus according to one embodiment.

FIG. 24 illustrates an outline of the image processing apparatus and the imaging system according to one embodiment. FIG. 25 schematically illustrates a detailed configuration example of the image processing apparatus according to one embodiment. FIG. 26 schematically illustrates an example of an angle change of an object. FIG. 27 illustrates an example of an processing operation of the image processing apparatus according to one embodiment.

The imaging system according to one embodiment includes an imager 10, an image cropper 11, a movement detector 20, a deformation detector 30, an image corrector 40, an exposure processor 50, an image output device 60, a captured image memory M1, a reference data memory M2, and a computed image memory M3. The movement detector 20 includes a pre-processor 21 and a change amount calculator 22. The exposure processor 50 includes an image computation unit 51 and an exposure computation unit 52. Note that the captured image memory M1, the reference data memory M2, and the computed image memory M3 may be configured as one memory as hardware.

A specific configuration example and a specific operation example regarding the image processing apparatus and the imaging system according to one embodiment will be described below along the flow of a processing operation illustrated in FIG. 27.

The imager 10 continuously captures images of the desired object (for example, the face). The captured image memory M1 stores a plurality of captured images continuously captured by the imager 10. The image cropper 11 detects the desired object image from each of the plurality of captured images stored in the captured image memory M1, crops out images corresponding to the desired object image, and outputs the images as the plurality of first cropped images (step S101 in FIG. 27).

The image cropper 11 detects appearance, disappearance, movement, a size change, or the like of the desired object image from each of the plurality of captured images stored in the captured image memory M1. The image cropper 11 adds additional information indicating coordinates of a cropping position, an image size, and the like to each of the plurality of first cropped images. At this time, in a case where, for example, a plurality of faces is detected as the desired object within an identical captured image, the image cropper 11 generates the first cropped image with respect to each of the faces. The additional information such as coordinates or the image size is used in the change amount calculator 22 of the movement detector 20, and is used for determination about whether or not the faces belong to an identical human figure and calculation of a change amount. The coordinates and image size of each of the plurality of first cropped images are precisely corrected by calculation of the change amount, fed back to the image cropper 11, and used for prediction or the like of a detection position of a desired object in the future.

The movement detector 20 detects the change amount of the desired object in the plurality of captured images continuously captured by the imager 10, and generates movement information regarding the desired object image. The movement detector 20 detects the change amount of the desired object on the basis of the plurality of first cropped images cropped out by the image cropper 11.

The movement detector 20 first transmits pre-processed images obtained by pre-processing on the first cropped images in the pre-processor 21 to the change amount calculator 22 (step S102 in FIG. 27). The pre-processor 21 performs a process appropriate for calculation of the change amount on the first cropped images as pre-processing. The pre-processor 21, for example, removes a singularity by replacing a pixel having a value that is largely deviated from values of surrounding pixels with an average value of surrounding pixels as the pre-processing. Additionally, the pre-processor 21 performs, for example, filter processing with a spatial low pass filter to remove a noise component that cannot be sufficiently removed by the removal of the singularity. Furthermore, the pre-processor 21 performs, as another processing, for example, processing of removing an image component that is likely to be an obstacle to calculation of the change amount, as necessary.

Subsequently, in the movement detector 20, the change amount calculator 22 determines whether or not calculation is the first calculation of the change amount (step S103 in FIG. 27). In a case of determining that the calculation is the first calculation (Y in step S103 in FIG. 27), the change amount calculator 22 subsequently stores the pre-processed images as reference data in the reference data memory M2

(step S105 in FIG. 27). In a case of determining that the calculation is not the first calculation (N in step S103 in FIG. 27), the change amount calculator 22 subsequently collates a new pre-processed image with the reference data, and calculates a change amount of the new pre-processed image with respect to the reference data (step S104 in FIG. 27).

The reference data memory M2 stores, as the reference data, a reference image used for detecting the change amount in the change amount calculator 22 of the movement detector 20. The reference data may include additional information indicating coordinates of a cropping position, an image size, or the like of each of the first cropped images serving as an original of the reference image. The change amount calculator 22 of the movement detector 20 detects the change amount of the desired object image with respect to the reference image. The movement detector 20 may perform an interpolation computation to calculate a movement locus of the desired object image on the basis of the plurality of captured images stored in the captured image memory M1, and detect the change amount of the desired object image on the basis of the movement locus.

The deformation detector 30 detects deformation of the desired object in the plurality of first cropped images. The movement detector 20 may exclude, from the plurality of first cropped images, a first cropped image in which the deformation of the desired object image is detected by the deformation detector 30 as a target of detection of the change amount of the desired object image, or handle the first cropped image as another object. Examples of the deformation include, in a case where the desired object is the face, a blink of eyes, shaking of the head, and the like.

The change amount detected in the change amount calculator 22 may include information regarding the position, size, and angle (yaw/pitch/roll) of the desired object image. The reference data memory M2 may store reference data on an object-by-object basis. The change amount calculator 22 may select optimal reference data on the basis of the information regarding the coordinates, the size, and the like from a plurality of pieces of reference data. The reference data may be updated as appropriate depending on a change in condition such as the elapse of time from first storage or a change in size. In a case where, as a result of calculation of the change amount, an error in the coordinates, size, or the like of the pre-processed images with respect to the reference data is acknowledged, the pre-processed images may be corrected. Reference data for which no new pre-processed image that should be collated therewith has come to the change amount calculator 22 for a predetermined time period may be deleted from the reference data memory M2.

Subsequently, the image corrector 40 acquires a plurality of precise second cropped images on the basis of movement information. The image corrector 40 then performs alignment processing on the plurality of acquired, second cropped images, and generates a plurality of corrected images (step S106 in FIG. 27).

The image corrector 40 performs the alignment processing on the plurality of second cropped images on the basis of the movement information generated by the movement detector 20, and thereby generates the plurality of corrected images in which the change of the desired object between the plurality of captured images is corrected. The image corrector 40 crops out the plurality of second cropped images corresponding to the desired object image in each of the plurality of captured images on the basis of the movement information and performs correction on the plurality of second cropped images on the basis of the movement information to generate the plurality of corrected images. The image corrector 40 corrects the change of the desired object image with respect to the reference image stored in the reference data memory M2. The image corrector 40 may acquire each second cropped image by cropping out an image from each first cropped image, or may acquire each second cropped image by newly cropping out an image from each of the plurality of captured images stored in the captured image memory M1. The image corrector 40 corrects a change in the position and a change in the size as correction of the change of the desired object image. Additionally, the image corrector 40 corrects, for example, a change in the angle of the object 100 (correction of rotation) such as shaking of the head as illustrated in FIG. 26, as the correction of the change of the desired object image. This enables alignment of the position, the size, or the like of the desired object image in the plurality of sequentially captured images.

Subsequently, the exposure processor 50 performs accumulation processing on the plurality of corrected images, and stores the plurality of corrected images as computed data in the computed image memory M3. The exposure processor 50 then acquires an image in an optimal state as an exposure image from the computed data (step S107 in FIG. 27). The image output device 60 outputs the exposure image generated by the exposure processor 50 to an external apparatus that demands the desired object image (for example, the face authentication system 4 in FIG. 23).

The exposure processor 50 generates the exposure image in the desired exposure state on the basis of the plurality of corrected images generated by the image corrector 40. The image computation unit 51 performs an integral computation on the plurality of corrected images. The computed image memory M3 stores computed data generated by an integral computation performed by the image computation unit 51.

The exposure computation unit 52 controls the image computation unit 51 to generate the exposure image in the desired exposure state. The exposure computation unit 52 generates the exposure image in the desired exposure state on the basis of computed data stored in the computed image memory M3. The exposure computation unit 52 may perform, in addition to control of the image computation unit 51, control of an imaging condition for the imager 10 that outputs the plurality of captured images. The imaging condition may be, for example, an exposure condition (stop, exposure time, and a gain), a frame rate, or the like.

In the integral computation performed by the image computation unit 51, when an integration time period is long, an exposure image corresponding to a long exposure image, that is, a low-speed shutter image, is obtained, and when the integration time period is short, an exposure image corresponding to a short exposure image, that is, a high-speed shutter image, is obtained. The computed data stored in the computed image memory M3 is read out as appropriate by the exposure computation unit 52, subjected to, for example, luminance normalization, and output as the exposure image. As a result, while imaging is performed with high-speed shutter release, it is possible to obtain the face image or the like with an exposure amount that is equivalent to long exposure by computational control after imaging.

Note that examples of a representative method of the integral computation include a finite impulse response (FIR) method and an infinite impulse response (IIR) method which are used in a digital filter. The image computation unit 51 may perform an integral computation that combines the FIR method and the IIR method depending on a demanded exposure amount and demanded image quality.

Figure 28:
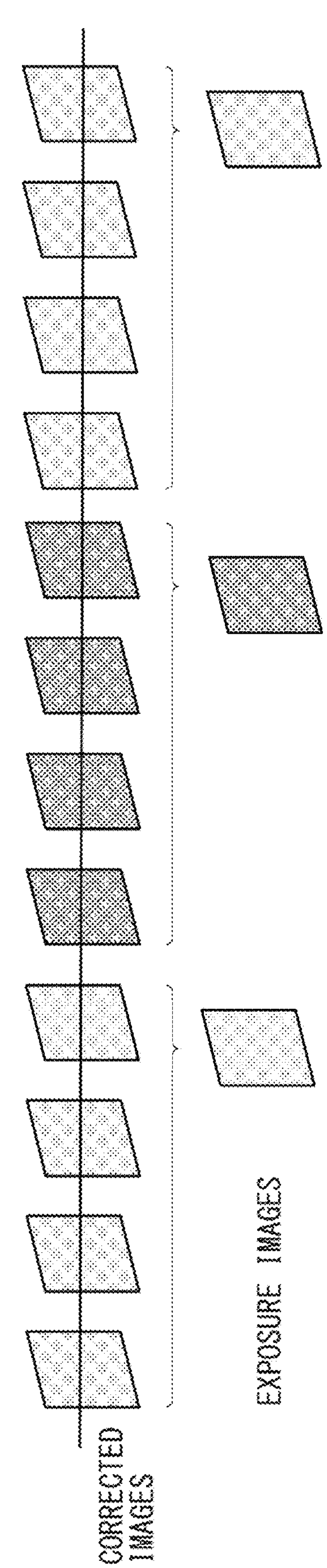
FIG. 28 is an explanatory view illustrating an outline of an integral computation on images according to a finite impulse response (FIR) method.

FIG. 28 illustrates an outline of the integral computation on an image according to the FIR method.

In a case where the FIR method is used, the image computation unit 51 stores a predetermined number of a plurality of corrected images in the computed image memory M3, and performs an averaging computation on the predetermined number of stored, corrected images to generate the exposure image.

Figure 29:
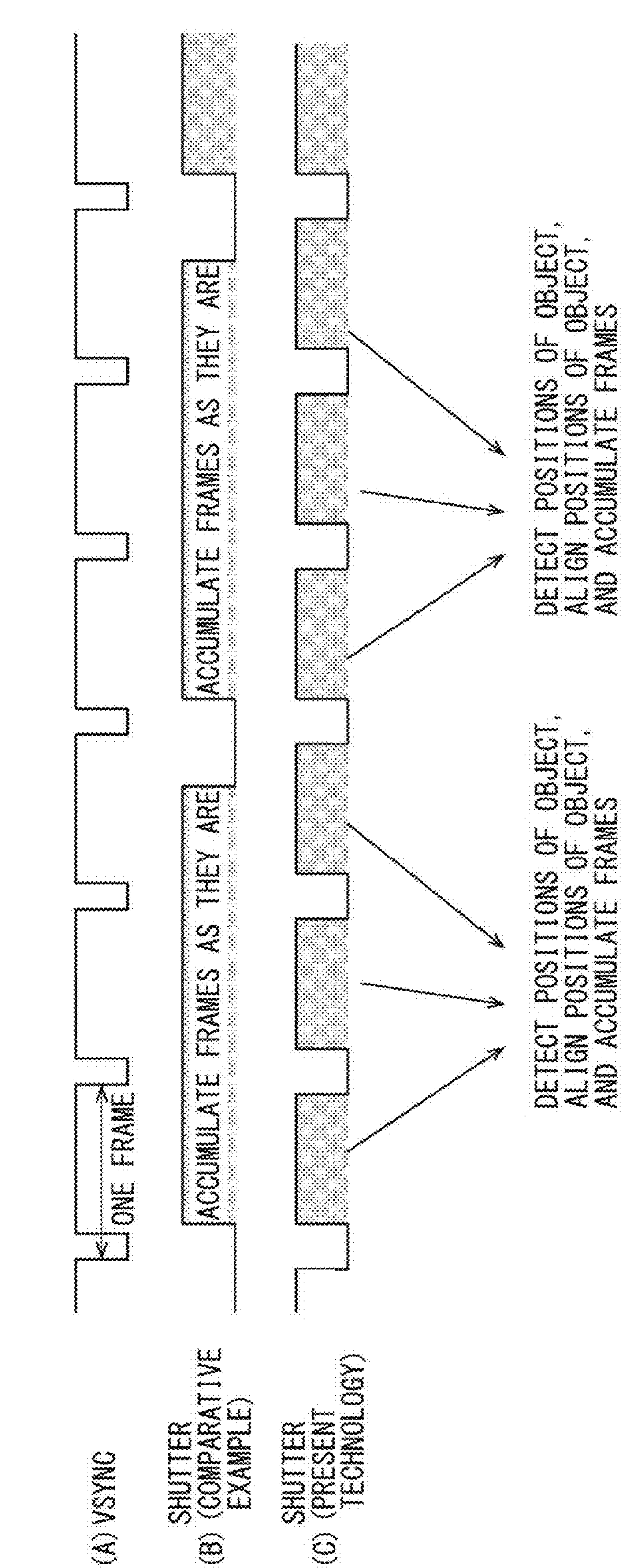
FIG. 29 is a timing chart indicating an outline of the integral computation on images according to the FIR method.

FIG. 29 is a timing chart indicating an outline of the integral computation on images according to the FIR method. In FIG. 29, (A) illustrates a vertical synchronizing signal (VSYNC), (B) illustrates a shutter timing in the technique according to the comparative example, and (C) illustrates an example of a shutter timing in the technique according to one embodiment.

In the technique according to the comparative example, as illustrated in (B) in FIG. 29, by performing long exposure exceeding one frame, it is possible to obtain an exposure image in which images in a plurality of frames are accumulated. In the technique according to one embodiment, as illustrated in (C) in FIG. 29, for example, by detecting the position of the desired object image in a plurality of images captured in one frame period and performing alignment processing and accumulation processing on the plurality of images including the desired object image, it is possible to obtain the exposure image corresponding to a long exposure image.

Figure 30:
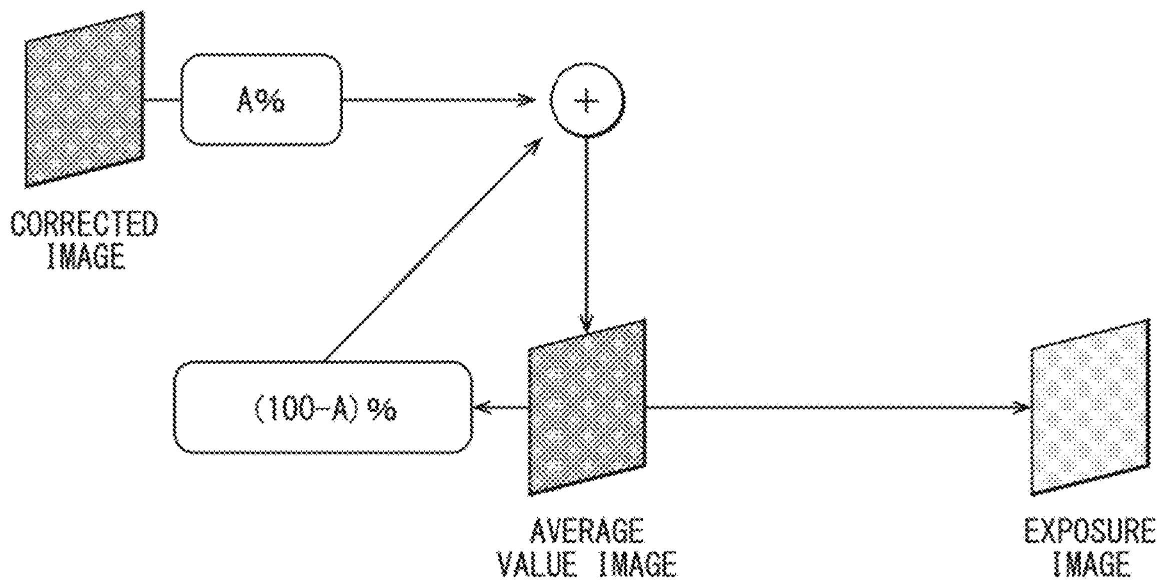
FIG. 30 is an explanatory view illustrating an outline of an integral computation on images according to an infinite impulse response (IIR) method.

FIG. 30 illustrates an outline of the integral computation on images according to the IIR method.

The IIR method is a method of determining a predetermined ratio (for example, A %) of a newly input image to an accumulated average value image and mixing the input image, and enables generation of a long-time moving average image with a small amount of memory. In a case where the IIR method is applied in the technique according to one embodiment, the average value image that is obtained from the plurality of corrected images and that is computed by the image corrector 40 is stored in the computed image memory M3, and the average value image is read out as the exposure image by the exposure computation unit 52 in a phase in which an exposure state becomes the desired exposure state.

[1.4 Modification Examples]

By combining the technique according to one embodiment with a face part detection technique, an image captured at a moment of a blink of eyes may be excluded from the exposure processing performed by the exposure processor 50. Additionally, the exposure processor 50 may select an image in a section with the least amount of a change in coordinates of the desired object in the plurality of continuously captured images and perform exposure processing.

In the technique according to one embodiment, the movement detector 20 may detect a change amount of each of a plurality of desired object images, as the desired object image, in each of a plurality of captured images. In this case, the image corrector 40 may generate a plurality of corrected images with respect to each of the plurality of desired object images. The exposure processor 50 may generate the exposure image in the desired exposure state with respect to each of the plurality of desired object images. It is possible to include a plurality of movement detectors 20, a plurality of reference data memories M2, a plurality of image correctors 40, a plurality of image computation units 51, a plurality of computed image memories M3, and a plurality of exposure computation units 52. Alternatively, it is possible to operate the movement detector 20, the reference data memory M2, the image corrector 40, the image computation unit 51, the computed image memory M3, and the exposure computation unit 52 in a time division manner. This enables generation of an individual exposure image in an optimal exposure state for each of a plurality of objects in an identical image.

[1.5 Effects]

As described above, in the technique according to one embodiment, the exposure image in the desired exposure state is generated on the basis of the plurality of corrected images corrected on the basis of the movement information regarding the desired object image in the plurality of continuously captured images. This enables generation of the image in the desired exposure state where each of noise and image blurring is suppressed after imaging.

In capturing of an image of an object moving at relatively high speed, even if the position and size of the object change within an angle of view of the camera, the shape of the object image does not change sharply. Hence, in the technique according to one embodiment, by detecting and cropping the desired object image in the plurality of images captured with high-speed shutter release, precisely aligning the position and size of the desired object image in each of the plurality of captured images, and superimposing the plurality of captured images upon one another, it is possible to obtain an image that is equivalent to a long exposure image. Especially, in the face authentication as the main field to which the technique according to one embodiment is applied, a main factor for the movement of the object is a walking motion, and the position and size of the face within the angle of view change, but the shape of the face does not change largely. Thus, even in a case where each of captured images continuously captured with high-speed shutter release lacks in light amount and has a large amount of noise, by aligning the position and size of the face image cropped from each of the captured images and superimposing the captured images, it is possible to obtain the face image with less noise. In contrast, since the background changes along with the movement of the face, image blurring is caused by superimposition. This affects a face authentication algorithm in a direction of reducing the influence of the background, and is rather advantageous.

The technique according to one embodiment enables capturing and obtaining of a high-quality image with less noise even if the object is a dark object. Additionally, it is possible to select an exposure method depending on a purpose after imaging.

Figure 31:
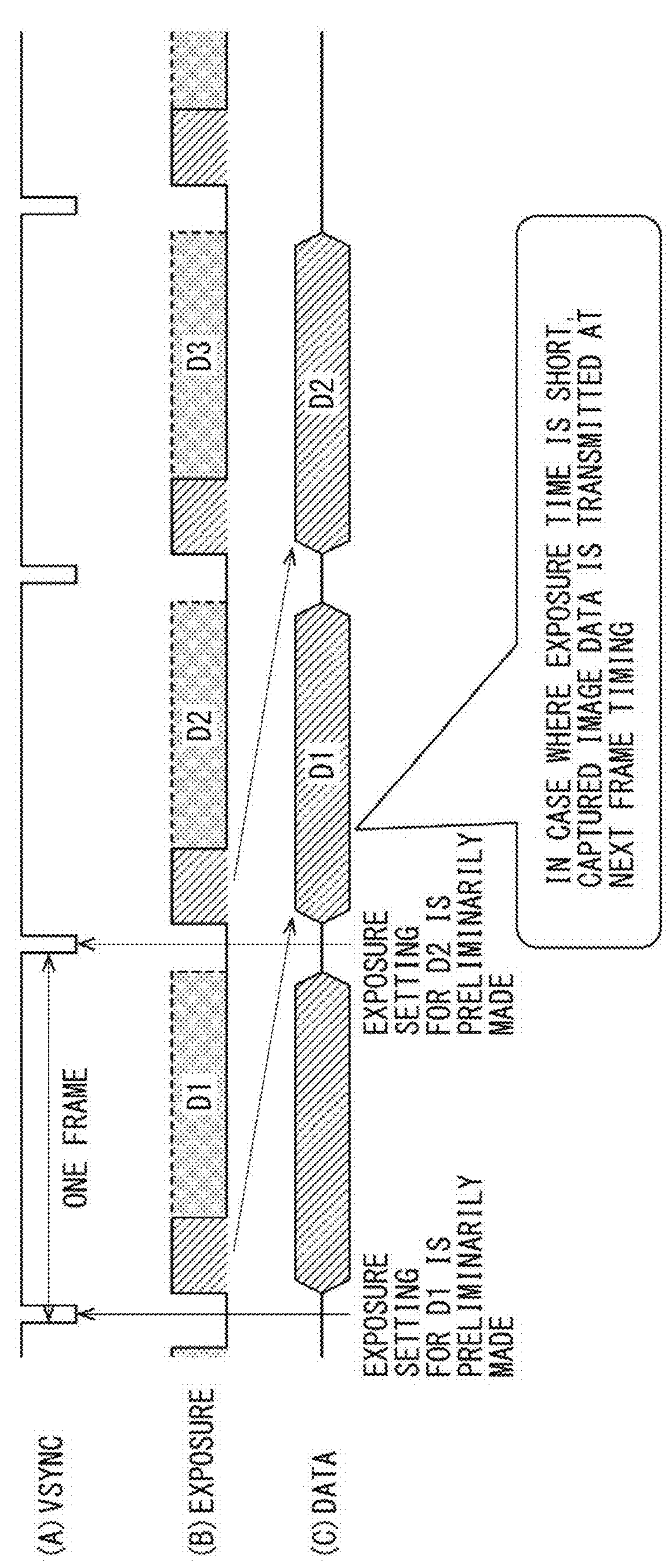
FIG. 31 is a timing chart schematically illustrating an example of a timing of outputting image data in a case where exposure time under exposure control according to a comparative example is short.
Figure 32:
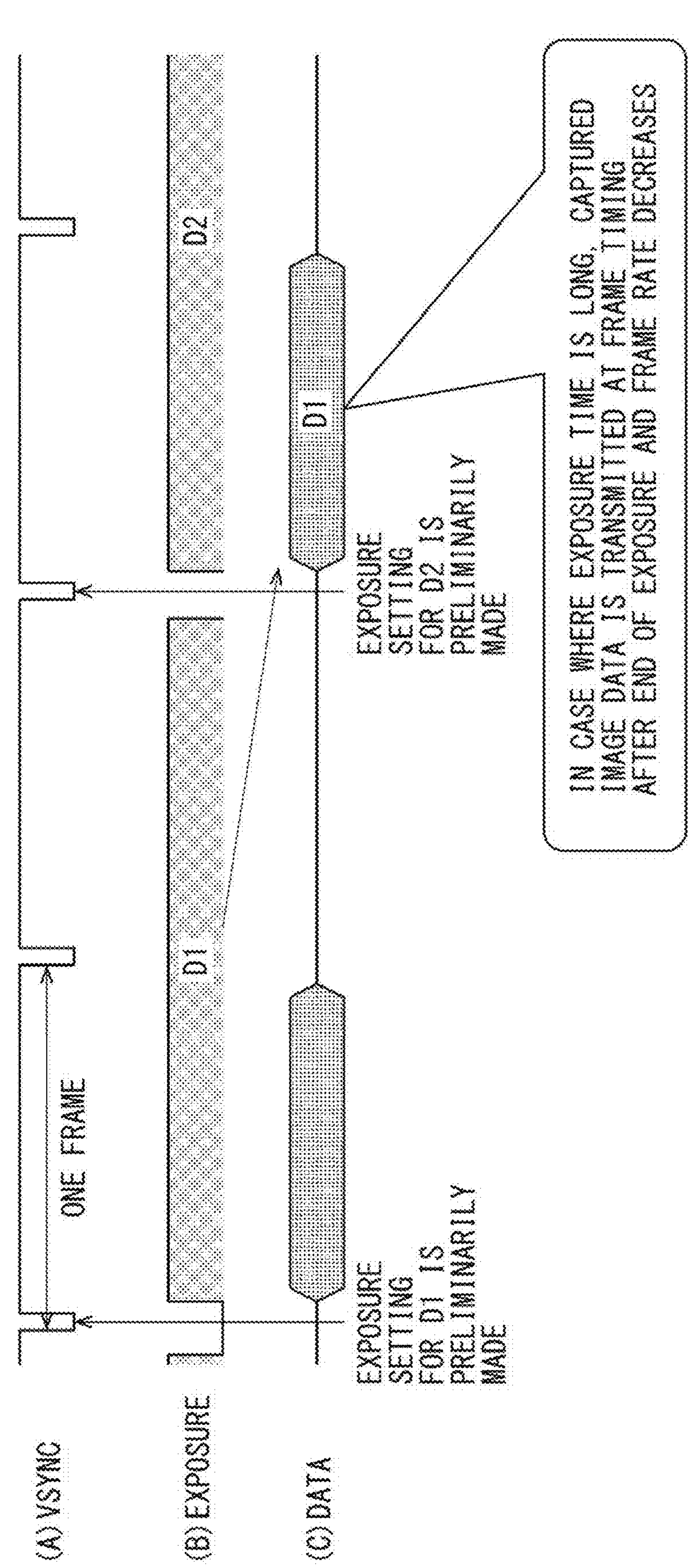
FIG. 32 is a timing chart schematically illustrating an example of a timing of outputting image data in a case where exposure time under the exposure control according to the comparative example is long.
Figure 33:
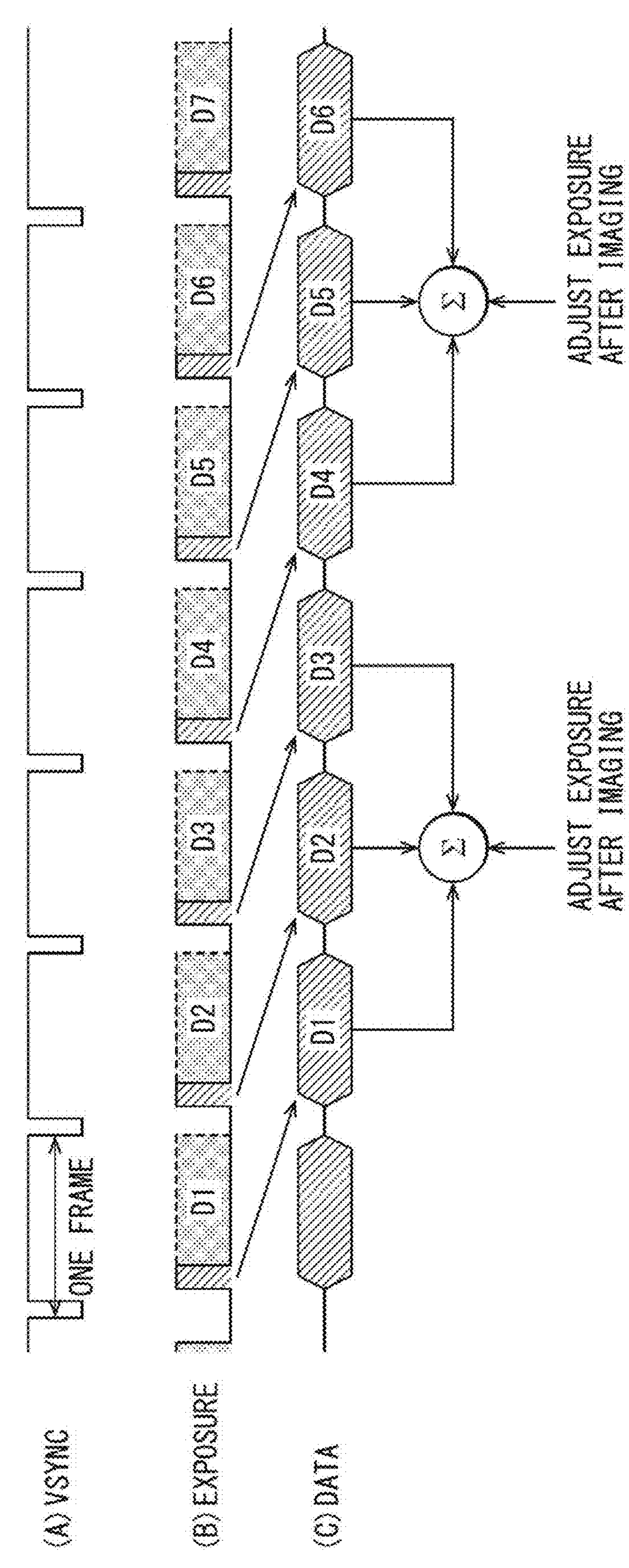
FIG. 33 is a timing chart schematically illustrating an example of a timing of outputting image data under exposure control according to one embodiment.

FIG. 31 is a timing chart schematically illustrating an example of a timing of outputting image data in a case where exposure time under exposure control according to the comparative example is short. FIG. 32 is a timing chart schematically illustrating an example of a timing of outputting image data in a case where exposure time under the exposure control according to the comparative example is long. FIG. 33 is a timing chart schematically illustrating an example of a timing of outputting image data under exposure control according to one embodiment. In FIGS. 31 to 33, (A) illustrates a VSYNC, (B) illustrates an exposure timing (shutter timing), and (C) illustrates an example of a timing of outputting image data.

Under exposure control according to the comparative example, in a case where exposure time is short (exposure time is within one frame period), each of continuously captured image data (D1, D2, D3, . . . ) is transmitted at a frame timing subsequent to a frame timing of imaging (exposure time) as illustrated in FIG. 31. In a case where exposure time is long (exposure time exceeds one frame period), each of continuously captured image data (D1, D2, D3, . . . ) is transmitted at a frame timing subsequent to a frame timing after the end of exposure as illustrate in FIG. 32. Hence, in a case where exposure time exceeds one frame period, a frame rate decreases. On the other hand, the technique according to one embodiment is a technique of combining a plurality of pieces of image data (D1, D2, D3 . . . ) and retroactively performing exposure adjustment corresponding to long exposure.

Note that the effects described in the present specification are merely examples, and effects are not limited thereto and may include other effects. Similar things apply to effects of other embodiments described below.

2. Other Embodiments

The technique of the present disclosure is not limited to the above description about one embodiment, and it is possible to make various kinds of modification to the technique.

For example, it is possible for the present technique to adopt the following configuration. According to the present technique having the following configuration, the exposure image in the desired object state is generated on the basis of the plurality of corrected images corrected on the basis of the movement information regarding the desired object image in the plurality of continuously captured images. This enables generation of the image in the desired exposure state where each of noise and image blurring is suppressed after imaging.

(1)

An image processing apparatus including:

a movement detector that detects a change amount of a desired object image in a plurality of continuously captured images and that generates movement information regarding the desired object image;

an image corrector that generates a plurality of corrected images in which a change of the desired object image between the plurality of captured images is corrected on a basis of the movement information generated by the movement detector; and an exposure processor that generates an exposure image in a desired exposure state on a basis of the plurality of corrected images generated by the image corrector.

(2)

The image processing apparatus according to (1), further including an image cropper that detects the desired object image from each of the plurality of captured images, that crops out images corresponding to the desired object image, and that outputs the images as a plurality of first cropped images, in which the movement detector detects the change amount of the desired object image on a basis of the plurality of first cropped images cropped out by the image cropper.

(3)

The image processing apparatus according to (2), in which the image cropper adds additional information indicating coordinates of a cropping position and an image size to each of the plurality of first cropped images.

(4)

The image processing apparatus according to any one of (1) to (3), in which the image corrector crops out a plurality of second cropped images corresponding to the desired object image in each of the plurality of captured images on the basis of the movement information and corrects the plurality of second cropped images on the basis of the movement information to generate the plurality of corrected images.

(5)

The image processing apparatus according to any one of (1) to (4), further including a reference data memory that stores reference data including a reference image for detection of the change amount in the movement detector, in which the movement detector detects the change amount of the desired object image with respect to the reference image.

(6)

The image processing apparatus according to (5), in which the image corrector corrects a change of the desired object image with respect to the reference image.

(7)

The image processing apparatus according to any one of (1) to (6), further including:

an image computation unit that performs an integral computation on the plurality of corrected images; and an exposure computation unit that controls the image computation unit and that generates the exposure image in the desired exposure state.

(8)

The image processing apparatus according to (7), further including a computed image memory that stores computed data generated by an integral computation performed by the image computation unit.

(9)

The image processing apparatus according to (8), in which the exposure computation unit generates the exposure image in the desired exposure state on a basis of the computed data stored in the computed image memory.

(10)

The image processing apparatus according to any one of (7) to (9), in which the exposure computation unit performs, in addition to control of the image computation unit, control of an imaging condition for an imager that outputs the plurality of captured images.

(11)

The image processing apparatus according to any one of (1) to (10), further including an image output device that outputs the exposure image generated by the exposure processor to an external apparatus that demands the desired object image.

(12)

The image processing apparatus according to any one of (1) to (11), in which the movement detector detects respective change amounts of a plurality of desired object images, as the desired object image, in each of the plurality of captured images.

the image corrector generates the plurality of corrected images with respect to each of the plurality of object images, and the exposure processor generates the exposure image in the desired exposure state with respect to each of the plurality of desired object images.

(13)

The image processing apparatus according to any one of (1) to (12), further including a captured image memory that stores the plurality of captured images, in which the movement detector performs an interpolation computation to calculate a movement locus of the desired object image on a basis of the plurality of captured images stored in the captured image memory, and detects the change amount of the desired object image on a basis of the movement locus.

(14)

The image processing apparatus according to any one of (2) to (13), further including a deformation detector that detects deformation of the desired object image in the plurality of first cropped images, in which the movement detector excludes, from the plurality of first cropped images, a first cropped image in which the deformation of the desired object image is detected by the deformation detector as a target of detection of the change amount of the desired object image.

(15)

The image processing apparatus according to any one of (1) to (14), in which the change amount detected by the movement detector includes information regarding a position, a size, and an angle of the desired object image.

(16)

The image processing apparatus according to (15), in which the image corrector corrects a change in the position, the size, and the angle of the desired object image as correction of a change of the desired object image.

(17)

An imaging system including:

an imager;

a movement detector that detects a change amount of a desired object image in a plurality of continuously captured images captured by the imager and that generates movement information regarding the desired object image;

an image corrector that generates a plurality of corrected images in which a change of the desired object image between the plurality of captured images is corrected on a basis of the movement information generated by the movement detector; and an exposure processor that generates an exposure image in a desired exposure state on a basis of the plurality of corrected images generated by the image corrector.

The present application claims the benefit of Japanese Priority Patent Application JP2022-46232 filed with the Japan Patent Office on Mar. 23, 2022, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus comprising:

a memory storing a program, and at least one processor configured to execute the program to perform operations comprising:

detecting a change amount of a desired object image in a plurality of continuously captured images and generating movement information regarding the desired object image;

generating a plurality of corrected images in which a change of the desired object image between the plurality of captured images is corrected on a basis of the generated movement information;

generating an exposure image in a desired exposure state on a basis of the plurality of corrected images;

detecting the desired object image from each of the plurality of captured images, cropping out images corresponding to the desired object image, and outputting the images as a plurality of first cropped images; and detecting the change amount of the desired object image on a basis of the plurality of first cropped images.

2. The image processing apparatus according to claim 1, wherein the operations further comprise:

adding additional information indicating coordinates of a cropping position and an image size to each of the plurality of first cropped images.

3. The image processing apparatus according to claim 1, further comprising a reference data memory that stores reference data including a reference image for detection of the change amount, wherein the operations further comprise detecting the change amount of the desired object image with respect to the reference image.

4. The image processing apparatus according to claim 3, wherein the operations further comprise:

correcting a change of the desired object image with respect to the reference image.

5. The image processing apparatus according to claim 1, wherein the operations further comprising:

outputting the exposure image to an external apparatus that demands the desired object image.

6. The image processing apparatus according to claim 1, wherein the operations further comprise:

detecting respective change amounts of a plurality of desired object images, as the desired object image, in each of the plurality of captured images;

generating the plurality of corrected images with respect to each of the plurality of object images; and generating the exposure image in the desired exposure state with respect to each of the plurality of desired object images.

7. The image processing apparatus according to claim 1, wherein the operations further comprising:

detecting deformation of the desired object image in the plurality of first cropped images; and excluding, from the plurality of first cropped images, a first cropped image in which the deformation of the desired object image is detected as a target of detection of the change amount of the desired object image.

8. An imaging system comprising:

an imager; and the image processing apparatus according to claim 1.

9. An image processing apparatus comprising:

a memory storing a program, and at least one processor configured to execute the program to perform operations comprising:

detecting a change amount of a desired object image in a plurality of continuously captured images and generating movement information regarding the desired object image;

generating a plurality of corrected images in which a change of the desired object image between the plurality of captured images is corrected on a basis of the generated movement information;

generating an exposure image in a desired exposure state on a basis of the plurality of corrected images;

cropping out a plurality of second cropped images corresponding to the desired object image in each of the plurality of captured images on the basis of the movement information and correcting the plurality of second cropped images on the basis of the movement information to generate the plurality of corrected images.

10. An image processing apparatus comprising:

a memory storing a program, and at least one processor configured to execute the program to perform operations comprising:

detecting a change amount of a desired object image in a plurality of continuously captured images and generating movement information regarding the desired object image;

generating a plurality of corrected images in which a change of the desired object image between the plurality of captured images is corrected on a basis of the generated movement information;

generating an exposure image in a desired exposure state on a basis of the plurality of corrected images;

performing an integral computation on the plurality of corrected images; and controlling performing the integral computation and generating the exposure image in the desired exposure state.

11. The image processing apparatus according to claim 10, further comprising a computed image memory that stores computed data generated by the integral computation.

12. The image processing apparatus according to claim 11, wherein the operations further comprise:

generating the exposure image in the desired exposure state on a basis of the computed data stored in the computed image memory.

13. The image processing apparatus according to claim 10, wherein the operations further comprise:

performing control of an imaging condition for an imager that outputs the plurality of captured images.

14. An image processing apparatus comprising:

a memory storing a program, and at least one processor configured to execute the program to perform operations comprising:

detecting a change amount of a desired object image in a plurality of continuously captured images and generating movement information regarding the desired object image;

generating a plurality of corrected images in which a change of the desired object image between the plurality of captured images is corrected on a basis of the generated movement information;

generating an exposure image in a desired exposure state on a basis of the plurality of corrected images;

storing, by a captured image memory, the plurality of captured images; and performing an interpolation computation to calculate a movement locus of the desired object image on a basis of the plurality of captured images stored in the captured image memory, and detecting the change amount of the desired object image on a basis of the movement locus.

15. An image processing apparatus comprising:

a memory storing a program, and at least one processor configured to execute the program to perform operations comprising:

detecting a change amount of a desired object image in a plurality of continuously captured images and generating movement information regarding the desired object image;

generating a plurality of corrected images in which a change of the desired object image between the plurality of captured images is corrected on a basis of the generated movement information;

generating an exposure image in a desired exposure state on a basis of the plurality of corrected images, wherein the change amount includes information regarding a position, a size, and an angle of the desired object image.

16. The image processing apparatus according to claim 15, wherein the operations further comprise:

correcting a change in the position, the size, and the angle of the desired object image as correction of a change of the desired object image.

17. A non-transitory computer readable medium storing a program, the program being executable by a processor to perform operations comprising:

detecting a change amount of a desired object image in a plurality of continuously captured images and generating movement information regarding the desired object image;

generating a plurality of corrected images in which a change of the desired object image between the plurality of captured images is corrected on a basis of the generated movement information;

generating an exposure image in a desired exposure state on a basis of the plurality of corrected images;

detecting the desired object image from each of the plurality of captured images, cropping out images corresponding to the desired object image, and outputting the images as a plurality of first cropped images; and detecting the change amount of the desired object image on a basis of the plurality of first cropped images.

* * * * *